United States Patent
Trummer

(10) Patent No.: US 6,354,477 B1
(45) Date of Patent: Mar. 12, 2002

(54) MOBILE COMPUTING BAG

(75) Inventor: Juliane Barbara Trummer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/327,559

(22) Filed: Jun. 8, 1999

(51) Int. Cl.[7] .................................................. A45F 4/02
(52) U.S. Cl. ......................... 224/575; 224/153; 224/578; 224/579; 224/581; 224/582; 224/627; 224/629; 224/645; 224/653
(58) Field of Search ................................ 224/153, 575, 224/578, 579, 581, 582, 627, 629, 645, 646, 650, 653, 676, 677, 678, 679, 680, 681, 930; 383/4; 190/11, 12; 206/320, 760

(56) References Cited

U.S. PATENT DOCUMENTS

| | | | |
|---|---|---|---|
| 5,395,023 A | * 3/1995 | Naymark et al. | 224/930 X |
| 5,447,215 A | * 9/1995 | Volkmar et al. | 190/11 |
| 5,494,157 A | 2/1996 | Golenz et al. | |
| 5,544,745 A | * 8/1996 | Famorca | 206/320 |
| 5,577,652 A | * 11/1996 | Cooper | 224/578 |
| 5,607,054 A | * 3/1997 | Hollingsworth | 206/320 |
| 5,639,004 A | 6/1997 | Carlton et al. | |
| 5,680,914 A | * 10/1997 | Reiser | 190/11 |
| 5,680,973 A | * 10/1997 | Vulpitta et al. | 224/153 |
| 5,706,992 A | 1/1998 | Moor | |
| 5,724,225 A | 3/1998 | Hrusoff et al. | |
| 5,762,170 A | 6/1998 | Shyr et al. | |
| 5,762,250 A | 6/1998 | Carlton et al. | |
| 5,826,770 A | 10/1998 | Chuang | |
| 5,881,932 A | * 3/1999 | Wadden | 224/153 |
| 5,881,934 A | * 3/1999 | Hung | 190/11 X |
| 5,887,723 A | * 3/1999 | Myles et al. | 206/760 |
| 5,887,777 A | 3/1999 | Myles et al. | |
| 5,971,148 A | * 10/1999 | Jackson | 206/320 |
| 6,193,118 B1 | * 2/2001 | Kearl | 224/153 |

OTHER PUBLICATIONS

Kawakami, Kenji, "99 More Un Useless Japanese Inventions" pp. 25 and 99, 1997, 1998.

* cited by examiner

Primary Examiner—Stephen K. Cronin
Assistant Examiner—Maerena W. Brevard
(74) Attorney, Agent, or Firm—Christopher H. Lynt; Matthew J. Bussan

(57) ABSTRACT

A carrying bag for receiving a portable personal computer, such as a laptop computer, is configurable to be carried in a briefcase mode, a shoulder bag mode, and a backpack mode. The bag can be configured to form stable frame or platform, thereby placing a personal computer received therein into an ergonomically comfortable position for working with while sitting, standing or even walking. Accessories and appliances can be accommodated within the bag and be readily accessible when the bag is set up as a stable frame or platform.

18 Claims, 25 Drawing Sheets

Backpack arrangement

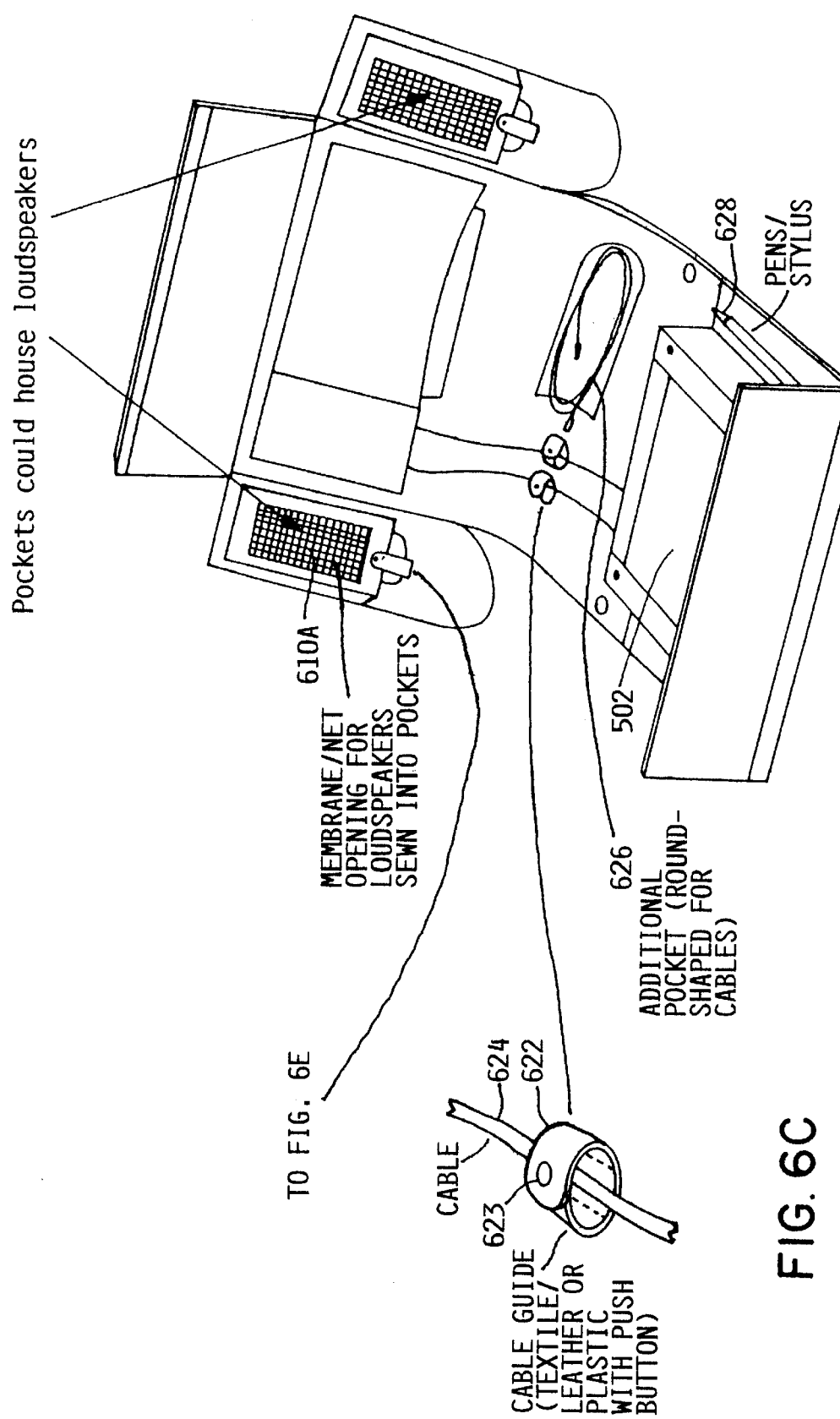

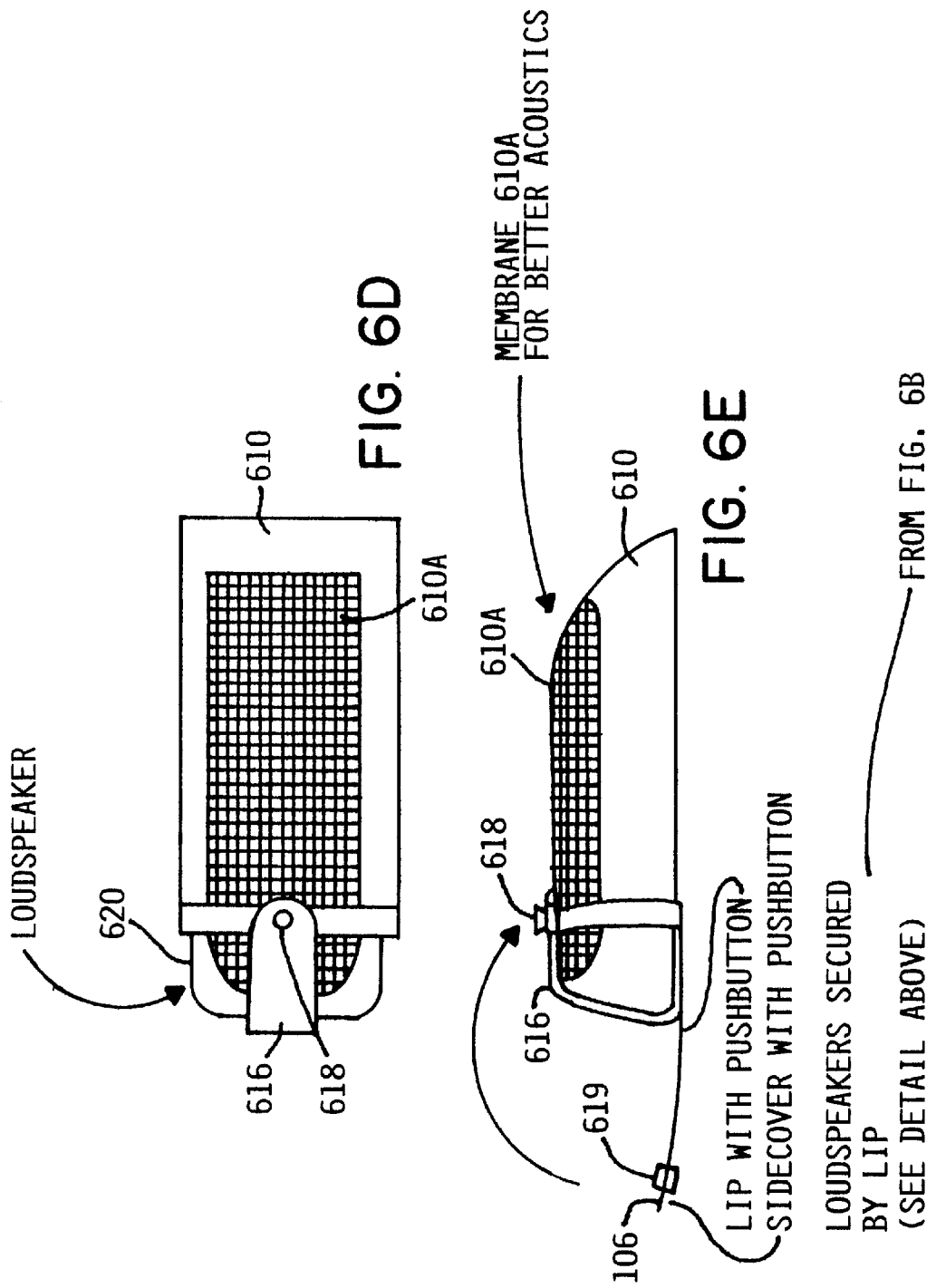

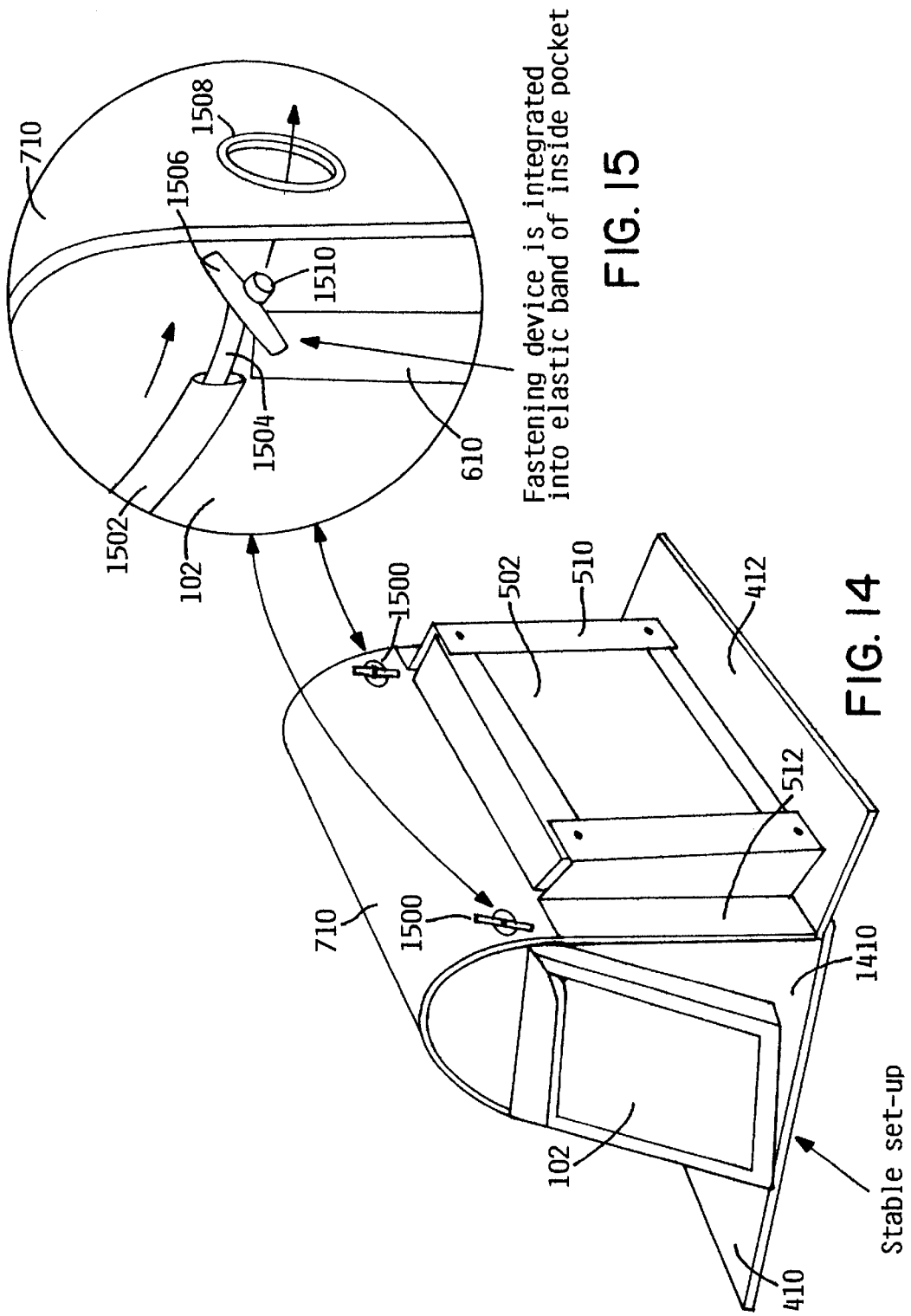

Fastening device fed through grommet

Application in an indoor (office or private) environment

MOBILE COMPUTING BAG

BACKGROUND OF THE INVENTION

1. Field of the Invention

The invention relates to the field of computer accessories, and in particular to a mobile computing bag for receiving a portable personal computer, such as a laptop computer, or the like.

2. Background Information

In this age of mobile computing, working on personal computers almost anywhere and at any time has become a part of the daily lives of many individuals in many various occupations. So-called laptop portable computers, so named because they fit easily on one's lap, have become commonplace among people on the go, such as attorneys, students, customer service personnel, and business executives, to name just a few.

Although carrying cases and the like, referred to herein generically as "bags," for manually transporting, i.e., carrying, portable computers are known, they are generally very simple and do not have many features. Known bags generally provide some degree of protection from mechanical shock due to an accidental impact during transporting, for example, and may also provide some degree of protection from environmental hazards, such as heat, light, dust and moisture, for example. Therefore, a primary purpose of any portable computer carrying bag is to protect the portable computer from minor accidental damage and environmental contamination during transport. Such portable computer carrying bags are generally designed to be lightweight for the user's convenience, but also relatively sturdy for the computer's protection.

Often such bags are provided with a hand strap for carrying the bag like a briefcase, and an optional shoulder strap for carrying the bag like a purse or shoulder bag, over one's shoulder. However, sometimes, due to the weight involved or the time the bag must be carried, such carrying arrangements become tiring and stressful. Usually, but not always, a portable computer can be operated without having to be completely removed from the carrying bag, although sometimes all of the computer's external connectors may not be accessible while the computer remains in the bag.

Although it is now a reality that portable computer users often have any number of necessary additional appliances and accessories to use with the computer, such as AC adapters and additional battery power packs, extension cords, external peripheral devices, such as an external modem or disk drive, PCMCIA computer card devices, a digital camera or other video device, external speakers, SmartDisk™ adapter devices, floppy diskettes, external mouse, keyboard, etc., conventional bags generally have very limited storage space, if any. Therefore, in such a situation, the portable computer user may be required to carry the personal computer in its bag, and to carry one or more additional bags for the accessories, when on the move, which may often be inconvenient.

Another problem is that there may be situations where using the portable computer on one's lap is not convenient, such as while walking or standing, or while performing customer service operations at a remote field installation, for example. In such situations, a tabletop or other suitable surface on which to rest the portable computer may not be readily available either. Conventional portable computer carrying bags have not adequately addressed this problem.

There are a number of computer carrying bags described in United States Patents. For example, U.S. Pat. No. 5,639,004 by Carlton et al. (Jun. 17, 1997) entitled "Convertible carrying case and work platform for small electronic devices" describes, according to the Abstract, a convertible carrying case and work platform for small electronic devices, particularly notebook computers, which is adapted to be used as a carrying case for the electronic device as well as a work platform. In one embodiment, the carrying case has a case structure which holds the electronic device and a flexible top cover portion capable of forming a rolled portion that elevates the case structure when the case is supported in the wearer's lap and used when the wearer is sitting or in a reclined position, or, when the wearer uses the case while in standing position, spaces the case at a distance away from the wearer's body and provides a cushion between the case and the abdominal area of the wearer. A strap arrangement for the case permits a wearer to support the case over his shoulder to transport the device, or to position the case in a generally horizontal position in front of and against the abdominal area of the wearer. The case is particularly suited to persons who choose to compute without the aid of a desk or a table, for example, while commuting or traveling, or for those who must compute on their feet, for example, by persons who inventory goods, like moving personnel who inventory the goods located on a premises in preparation for packing and shipping the goods, by persons conducting retail invoicing and pricing, and by census takers, building inspectors and insurance adjusters. (See also U.S. Pat. No. 5,762,250 by Carlton et al., Jun. 9, 1998.)

U.S. Pat. No. 5,494,157 by Golenz et al. (Feb. 27, 1996) entitled "Computer bag with side accessible padded compartments" describes, according to the Abstract, that dozens of companies offer many different types of cases specifically designed to carry microcomputers. One type of microcomputer, the laptop style, can be carried by hand or from a shoulder strap in such cases. Unfortunately, as these microcomputers become more powerful tools for scientists, students, engineers, artists, and medical personnel, there is a ever greater need to protect these devices while enhancing their ready access and ease of use. These two conflicting requirements, easy removal from the carrying case, and superior protection from weather and impact, have not been adequately met by these several computer cases. This computer case provides a main packing space for the microcomputer defined by a "C" shaped rigid frame and corresponding shock absorbing pad, the forth side of the packing space is selectively closed by a padded access door. The handle and/or shoulder strap is riveted to the upper side of this "C" shaped frame. The access door is integrally hinged to the lower side of the frame, and is secured to the case when closed by double slide fastener and hook and loop fasteners.

U.S. Pat. No. 5,762,170 by Shyret al. (Jun. 9, 1998) entitled "Combination briefcase and computer bag assembly" describes, according to the Abstract, the combination of a briefcase and a computer bag assembly which includes a housing member having a bottom member, a plurality of side members, and a pair of pivotal top flap members. One of the side members includes a flexible floating compartment that is dimensionally configured to receive a portable computer. When the portable computer is held in the flexible floating compartment, it will substantially extend in the briefcase enclosure to protect the portable computer. Straps on the top flaps enable a top flap to be held in an open position when fastened about an extendable handle.

U.S. Pat. No. 5,724,225 by Hrusoff et al. (Mar. 3, 1998) entitled "Laptop computer carrying tray" describes, according to the Abstract, a supporting device for a laptop type model computer unit. The device is constructed and arranged for the support and stabilization of the laptop computer or notebook type computer unit when directly positioned in front of, or before, the user in order to permit the maximum amount of stability and thus allowing the operator to freely stand, sit, walk, carry, or move about with the computer unit intact when in an upright position with little or no stress. The instrument, when in its operational position, has an over the shoulder or over the neck strap, connecting the central computer carrying tray directly before or perpendicular to the user's body. Because the instrument is arranged perpendicularly to the body, the user has maximum stability of the entire computer unit and access to its operational surface.

U.S. Pat. No. 5,706,992 by Moor (Jan. 13, 1998) entitled "Backpack for carrying a laptop computer" describes, according to the Abstract, a backpack for carrying a laptop computer including flexible front, rear, bottom and side panels the interior surfaces of which define the interior of the backpack. The side panel extends along each side and across the top of the backpack and the front, rear and side panels are joined together along their perimeters. A compartment for storing a laptop computer in the interior of the backpack is provided. A first closure means extending longitudinally along the side panel and transversely across the top controls access to the compartment. At least one adjustable interlocking assembly is joined to the backpack so as to bridge the first closure at the bottom half of the backpack whereby pivotal separation of the first closure along the side and the top panels is restricted to a predetermined interval when the closure means is opened. A pair of adjustable shoulder straps are connected to the exterior of the rear panel for carrying the backpack.

U.S. Pat. No. 5,826,770 by Chuang (Oct. 27, 1998) entitled "Carrying bag for a notebook computer and peripherals" describes, according to the Abstract, a carrying bag for a notebook computer and peripherals which includes a rectangular case provided with a handle, a shoulder strap, and two positioning straps, the straps having two engageable connectors, a cover having one side connected with one side of the rectangular case and three sides sealably connected with the rectangular case by a zipper, a pair of supporting straps connected between the rectangular case and the cover, each of the supporting straps having an inner side provided with a seam at an intermediate portion thereof, and a rectangular tray having four vertical side walls and a bottom wall, the rectangular tray being dimensioned to fit into the rectangular case, whereby a notebook computer and necessary peripherals may be used conveniently anywhere.

U.S. Pat. No. 5,887,777 by Myles et al. (Mar. 30, 1999) entitled "Computer carrying bag" describes, according to the Abstract, a protective carrying bag for a computer which includes opposing front and back walls. An opening in the front wall provides access by a user for viewing a screen on the computer when the computer is contained within the bag. Opposing openable first and second side walls as well as a lower wall extend between the front and back walls. An openable upper flap is positioned between the front and back walls. A carrying strap is included which is capable of being secured in a first arrangement for carrying the bag in a substantially vertical orientation and in a second arrangement for carrying the bag in a substantially horizontal orientation such that the computer can be operated through the opening in the front wall while being carried in the substantially horizontal orientation.

However, a need exists for an improved portable computer bag which can overcome many of the limitations of conventional bags. Although the above problems have been described with respect to portable computers, other types of devices, such as scientific instruments, measuring equipment, or portable communications equipment, as examples, are also subject to the same problems, and the need for an improved carrying bag applies equally to these other devices.

SUMMARY OF THE INVENTION

It is, therefore, a principle object of this invention to provide an improved carrying bag, in particular, an improved mobile computing bag.

It is another object of the invention to provide a carrying bag, in particular, a mobile computing bag, that solves the above mentioned problems by providing enhanced functionality and convenience.

These and other objects of the present invention are accomplished by the mobile computing bag disclosed herein.

According to one aspect of the invention, an exemplary embodiment of a mobile computing bag protects a portable computer in a lightweight, sturdy bag.

According to another aspect of the invention, an exemplary embodiment of a mobile computing bag allows a user to comfortably carry the portable computer in a number of different ways. For example, the bag can be carried as a backpack, a shoulder bag, or a briefcase. Conversion between these carrying modes is accomplished by the simple modification of one or more straps on the bag. Since portable computer equipment can sometimes be quite heavy, especially any such equipment the size a laptop computer or larger, it may be very beneficial from an orthopedic standpoint to carry the loaded mobile computing bag as a backpack. This may be especially true if it is to be carried for an extended length of time or over a great distance, such as on an expedition to a remote wilderness location, for example.

According to another aspect of the invention, an exemplary embodiment of a mobile computing bag can be opened and adjusted to form a stable frame or freestanding platform to place a computer received therein into an ergonomically comfortable position for working with, sitting, standing or even walking. The bag can be strapped to the body of a user in a position which is comfortable for standing or walking while working with a computer carried therein.

According to another aspect of the invention, an exemplary embodiment of a mobile computing bag allows for easy access to a number of pockets, where supplemental equipment, such as AC adapters and additional battery power packs, extension cords, external peripheral devices, such as an external modem or disk drive, PCMCIA computer card devices, a digital camera or other video device, external speakers, SmartDisk™ adapter devices, floppy diskettes, external mouse, keyboard, etc., may be conveniently stored.

According to another aspect of the invention, an exemplary embodiment of a mobile computing bag permits access to connectors on the computer without requiring removal of the computer from the bag.

According to another aspect of the invention, an exemplary embodiment of a mobile computing bag is provided with a removable textile inner case for holding a computer or the like therein while in or out of the bag.

According to another aspect of the invention, an exemplary embodiment of a mobile computing bag simultaneously provides for elegant styling and for the application of a logo or design emblem, for example, according to the wishes of the respective user or manufacturer.

These and other aspects of the invention will become apparent from the detailed description set forth below.

BRIEF DESCRIPTION OF THE DRAWINGS

FIG. 6B illustrates an embodiment of the bag shown in FIG. 6A.

FIG. 6C illustrates details of a cable guide according to the embodiment of FIG. 6B.

FIGS. 6D and 6E illustrate details of a loudspeaker pocket according to the embodiment of FIG. 6B.

FIG. 14 is a view illustrating a mobile computing bag in a final stage of being set up to form a triangular frame according to an exemplary embodiment of the present invention.

FIG. 15 is a detail of a fastening device shown in FIG. 14 according to an exemplary embodiment of the present invention.

DETAILED DESCRIPTION OF THE PREFERRED EMBODIMENT(S)

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

An exemplary embodiment of the invention is illustrated and described herein in the form of a versatile mobile computing bag which is adapted and designed to have a variety of useful configurations.

Figure 1:
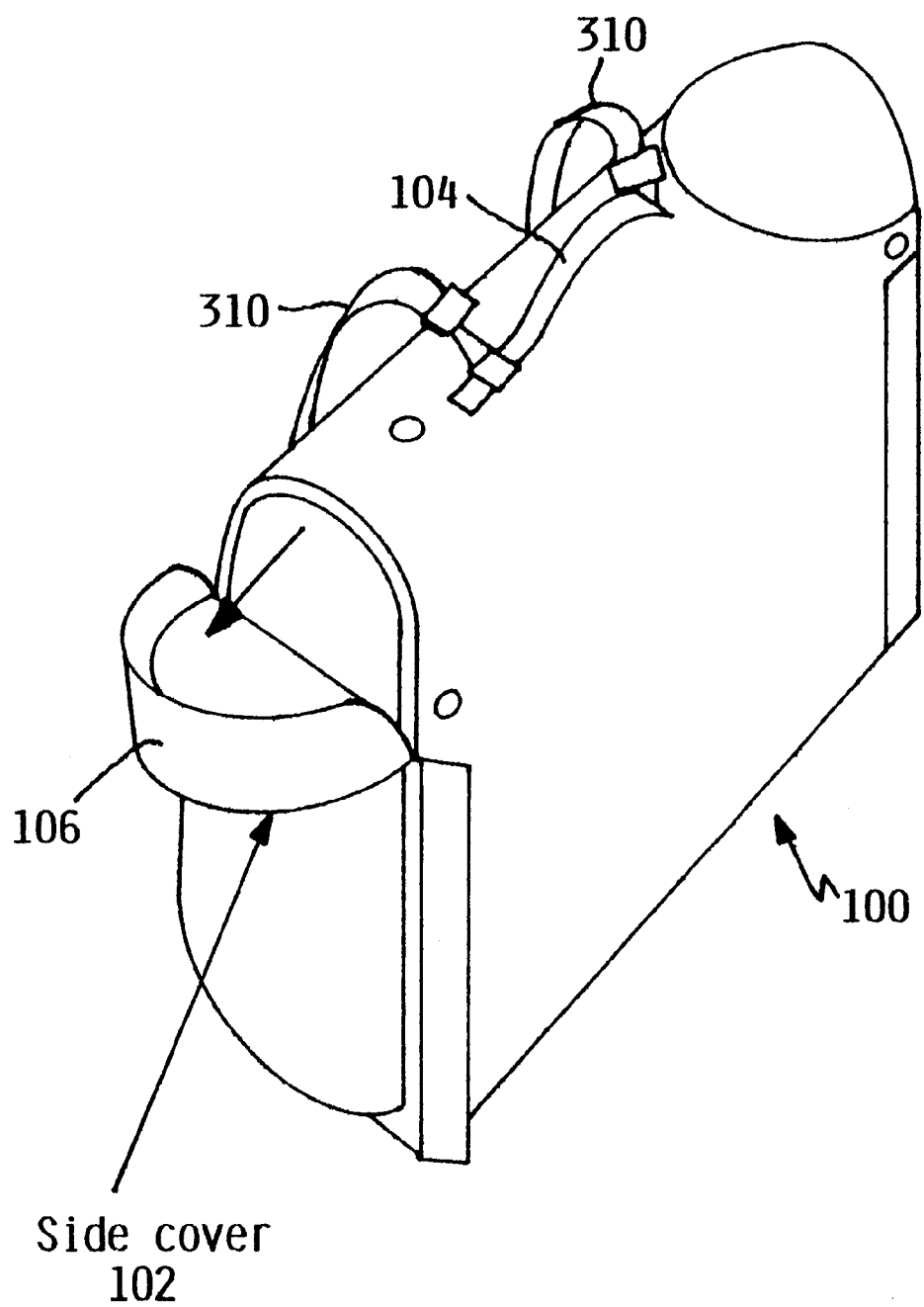
FIG. 1 is a top view illustrating a mobile computing bag according to an exemplary embodiment of the present invention.
Figure 2A:
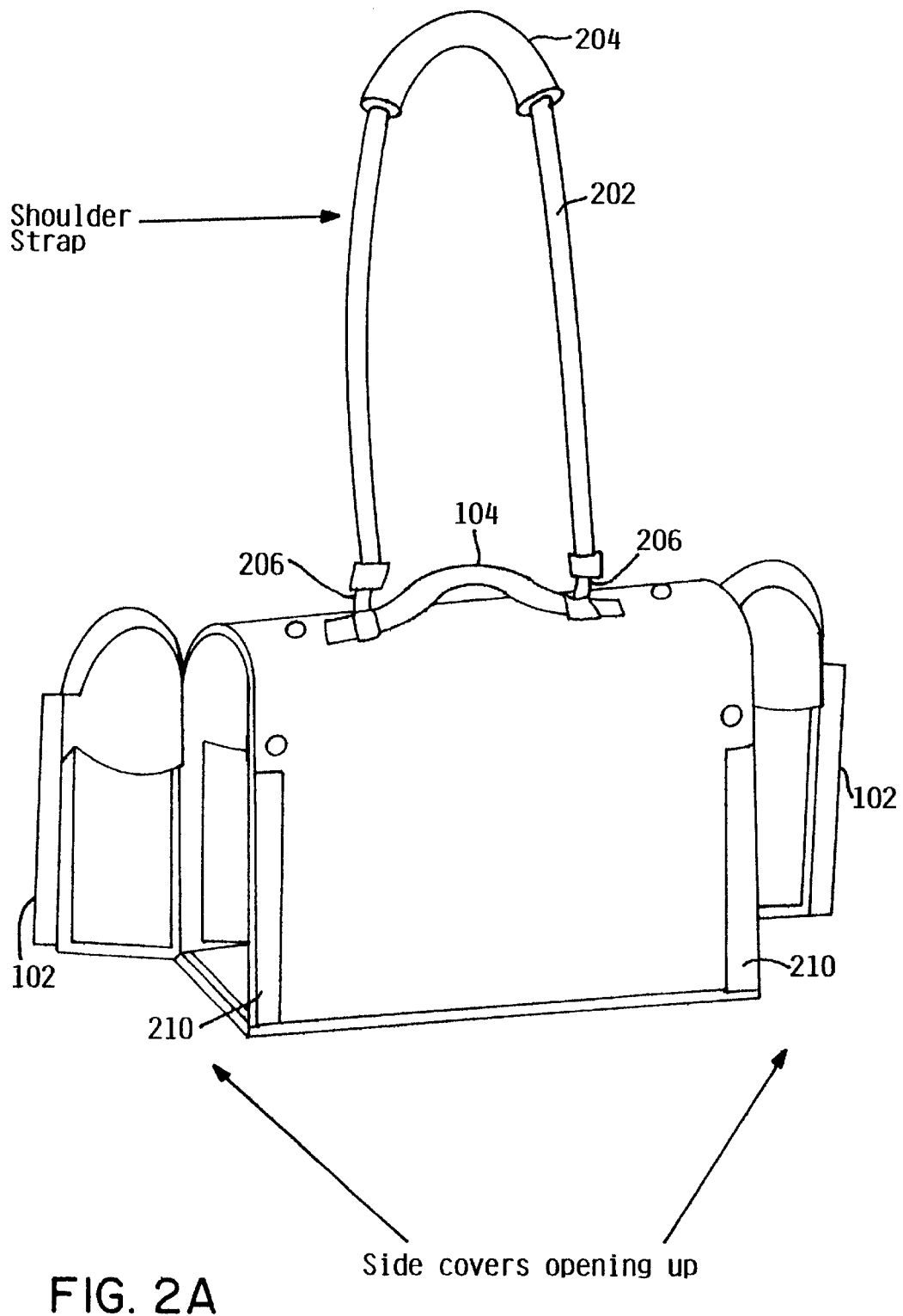
FIG. 2A is a front view illustrating a mobile computing bag in a shoulder carrying mode according to an exemplary embodiment of the invention.
Figure 2B:
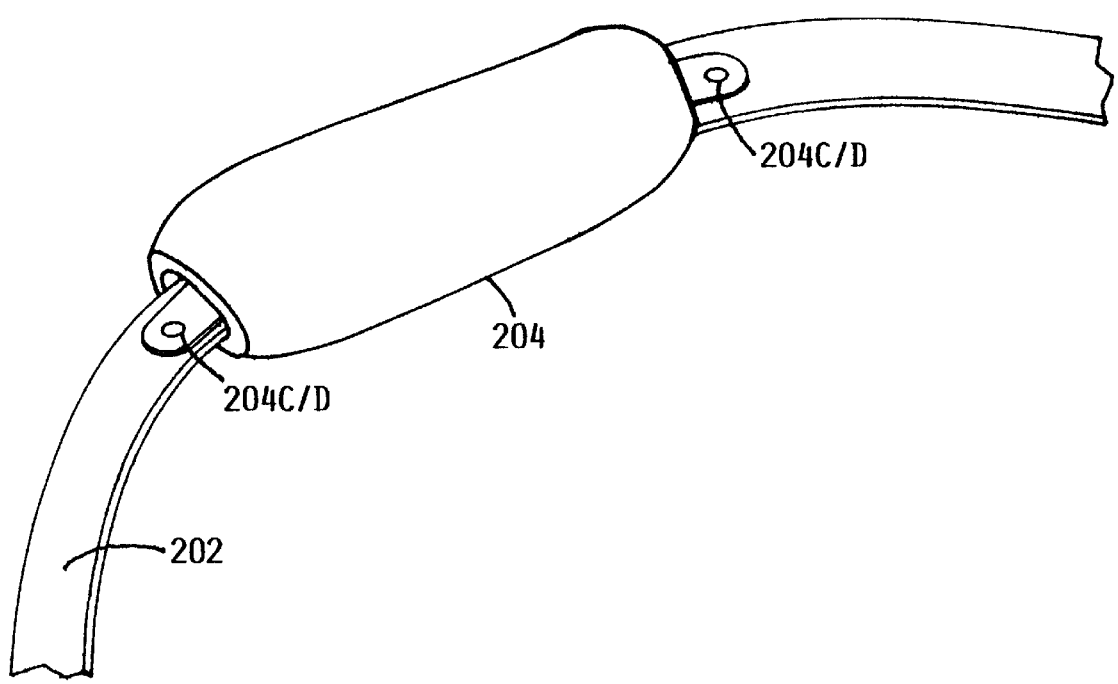
FIGS. 2B, 2C, 2D and 2E illustrate a shoulder strap and cushion arrangement according to an exemplary embodiment of the bag shown in FIG. 2A.
Figure 2C:
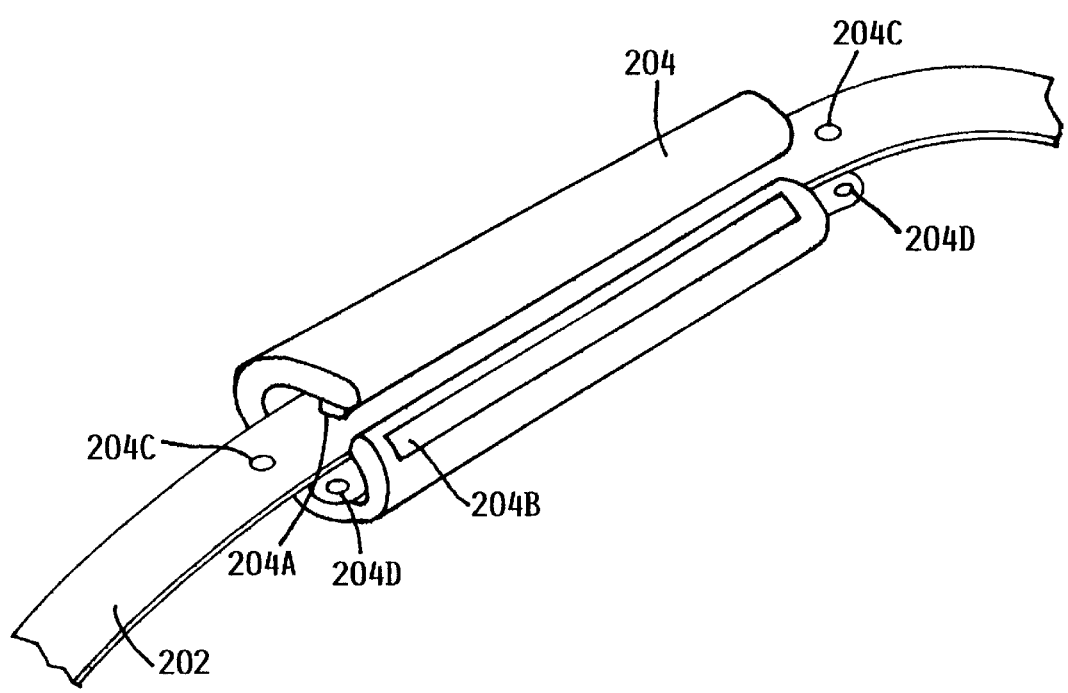
Figure 2D:
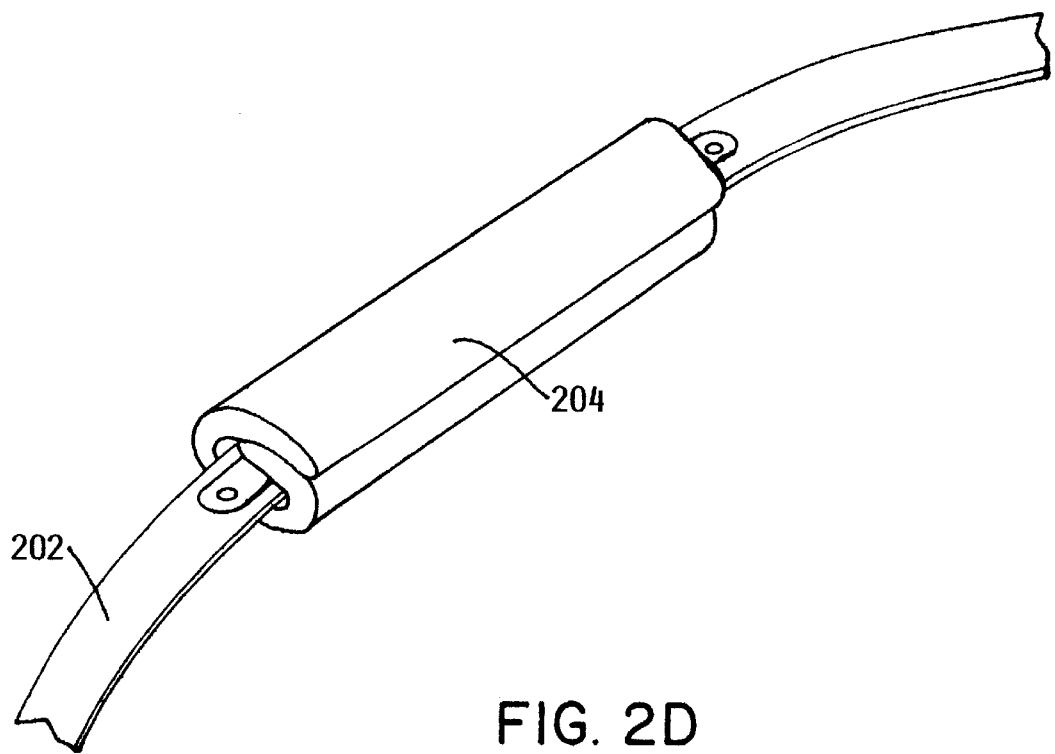
Figure 2E:
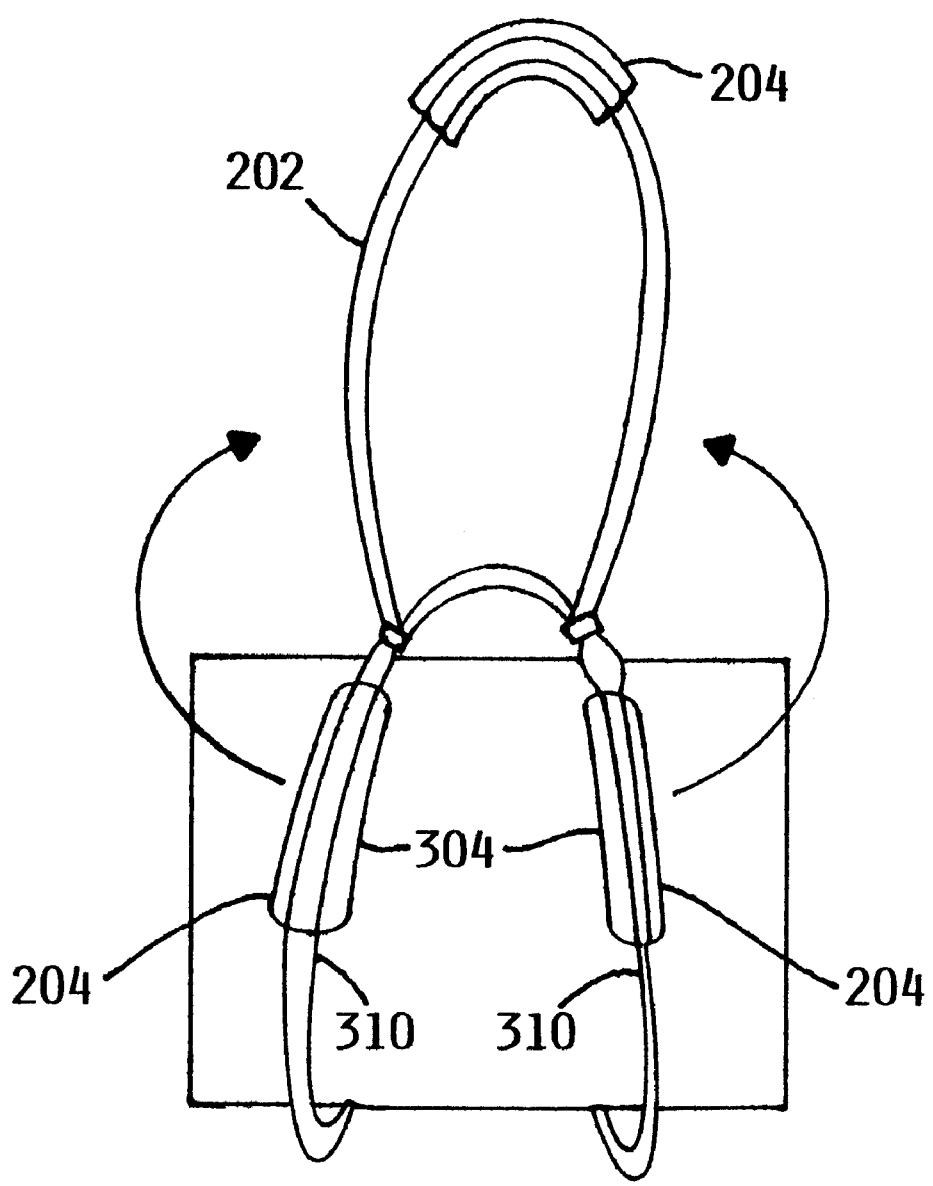
Figure 3:
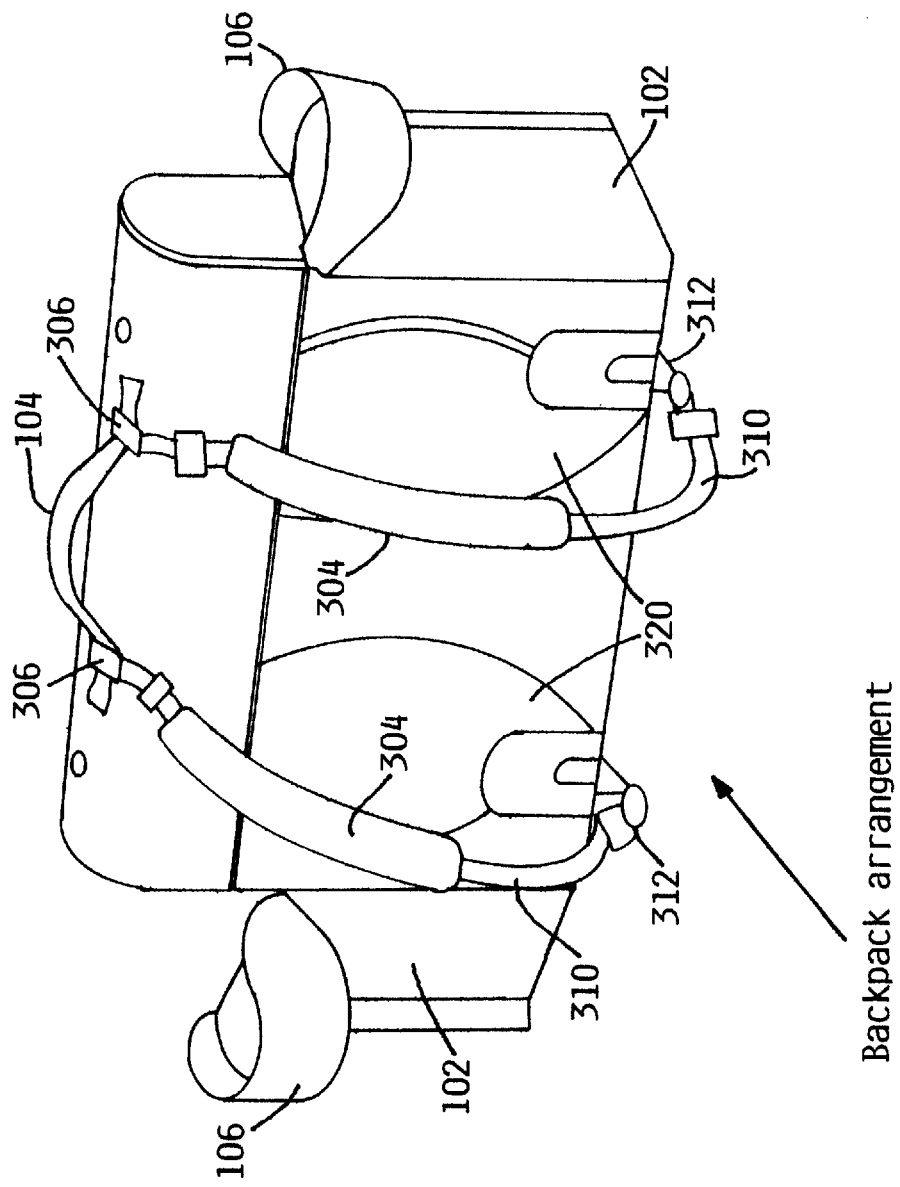
FIG. 3 is a back view illustrating a mobile computing bag in a backpack carrying mode according to an exemplary embodiment of the invention.

With reference to FIGS. 1 to 3, when the bag 100 is closed, it mainly stores, protects and serves as a sturdy but lightweight carrying device for any portable computer and the computer's necessary appliances and accessories, such as AC adapters and additional battery power packs, extension cords, external peripheral devices, such as an external modem or disk drive, PCMCIA computer card devices, a digital camera or other video device, external speakers, SmartDisk™ adapter devices, floppy diskettes, external mouse, keyboard, among others.

The bag 100 can be carried in at least three main ways depending on a user's preference: as a briefcase (FIG. 1), as a shoulder bag (FIG. 2A), or as a backpack (FIG. 3). For carrying the bag 100 in the mode of a briefcase (FIG. 1), a handle 104 is provided as shown at a top portion of the closed bag 100. In this mode, the bag 100 is designed to rest on the ground or other surface in a stable, upright position, with the handle 104 at the top of the bag 100, as depicted in FIG. 1. In this position, from the perspective of FIG. 1, one side cover 102 is visible having a top portion 106 thereof folded open. Opening the side covers 102 is the first step in opening the bag 100, a process which will be described below.

With the bag 100 in the upright position of FIG. 1, a shoulder strap 202 may be removably attached by fasteners 206, to form a shoulder bag, as shown in FIG. 2A. The shoulder strap 202 is illustrated having a shoulder cushion or "pad" 204 which could be made of compression molded or Ensolite closed cell foam, for example. FIGS. 2B, 2C and 2D show details of exemplary shoulder pads 204, which are configured to be removable (see FIGS. 2C and 2D). In particular, the pad 204 may be in the form of a tube which wraps around the strap 202. The tube could be whole FIG. 2B. Alternatively, the tube could be sliced longitudinally, as can be seen in FIG. 2C, and provided with Velcro™ strip set 204A, 204B placed to hold the edges of the tube closed around the strap 202 when the pad 204 is in use. In either alternative, button-hook or snap sets 204C, 204D are provided at both ends of the pad 204 hold the pad 204 in place on the strap 202. Of course, there are other shoulder strap/pad arrangements which are possible within the spirit of the invention, as would be recognized by one skilled in the art.

Preferably the shoulder strap 202 is formed by joining together backpack shoulder straps 310. This can be accomplished by detaching the lower ends of straps 310, removing one of the two pads 304, joining the straps 310 together at their other ends, and covering the joint with one of the pads 304 which now becomes pad 204. This process is illustrated in FIG. 2E. The button-hook or snap sets 204C, 204D which hold pad 204 in place may be part of the joint holding straps 310 together as strap 202.

As can be seen in FIG. 2A, the fasteners 206 are conveniently disposed at opposite ends of the handle 104 on the top of the bag 100, however, they could be easily placed in other positions to form a shoulder bag.

FIG. 2A also shows both side covers 102 in an opened position. Snaps, zippers, or preferably Velcro™ type fasteners 210, for example, could be used to secure the side covers 102 in a closed position, to the bag 100. Preferably the side covers 102 are stitched to or formed integrally with the material of the bag 100 along each side, forming flap-like or wing-like structures, as depicted in FIG. 2A.

FIG. 3 illustrates the bag 100 configured in a backpack mode for carrying on one's back in the style of a backpack. In this regard, a strap arrangement is provided, including straps 310 which are preferably removably attached by the fasteners 306 at opposite ends of the handle 104, and by additional fasteners 312 disposed near the bottom of the bag 100 for removably securing the other ends of the straps 310 to the bag 100. Where the fasteners 306 and 312 are positioned on the bag material, reinforcing material, such as a leather or vinyl patch, would preferably be provided for added strength.

Cushions 304 on the backpack-type straps 310 are provided to help insure comfortable carrying of the bag 100 in this mode. These cushions 304 may be identical pieces to the previously described pad 204 used in the shoulder strap mode. In fact, the shoulder strap 202 could be the identical piece to straps 310. In this regard, it may be advantageous to used one strap and cushion in both modes, i.e., shoulder bag and backpack carrying modes. For the backpack mode, an additional identical strap/pad arrangement would be used. This second strap/pad could be stored in one of the many storage pockets when the shoulder bag carrying mode is being used, for example.

It is also contemplated that a single strap 202 could be used in both arrangements, an additional cushion 304 being added in the backpack mode. In this single strap arrangement, the strap 202 could be reconfigured, using grommets for example, to provide the two apparent straps 310. This would advantageously reduce the number of pieces needed for the multiple configurations.

The panel area between the straps 310 on the bag 100, which would preferably be formed of a fabric covered rigid member, for example, could also be provided with cushioning pads 320 for comfortably resting against the back of a person carrying the bag 100 in this manner. The pads 320 could be made from compression molded polyethylene foam or an Ensolite closed-cell foam, for example. Alternatively, the panel rigid member itself could be made in one piece with the padding as a panel of compression molded polyethylene foam, for example. Compression molded polyethylene foam may be desirable for the panel rigid members since it can be formed into customized shapes and given different densities and can serve the dual role of cushion padding.

In its closed position, the bag 100 mainly stores, protects, and serves as a carrying device for any portable computer and its appliances/accessories. The bag 100 can be made from any number of materials, such as a synthetic or blend woven material, reinforced with stiff composite panels, for example, to make it lightweight and strong. One skilled in the art would recognize that there are any number of well known materials which would be suitable, such as "Pack Cloth" nylon or Cordura nylon.

FIG. 1 shows a handle 104 for using the bag 100 in a briefcase carrying mode, and straps 310 for the backpack carrying mode are also visible in part in FIG. 1, attached to the bag at opposite ends of the handle 104. If the backpack carrying mode is not used, one or both of these straps 310 could be removed and stored within the bag 100, or elsewhere. Preferably, however, one or both of the straps 310 are used for the shoulder bag strap 202 in the shoulder strap carrying mode, as was described earlier. If both straps 310 are joined and used as strap 202, one of the cushion pads 304 would be removed and stored, while the other one is used to cover the joint and form shoulder pad 204, as was described earlier. The fastener for securing the straps 310 would preferably be a ring and closed hook type arrangement, for example, as is commonly used with backpacks, and the like. Of course, other fastening arrangements are possible within the spirit of the invention.

To unfold and open the bag 100 to access the portable computer, or other equipment stored therein, e.g., a laptop computer, one might start by opening up the side covers 102 as shown in FIGS. 1 and 2A, for example. It is noted that the bag 100 may be formed of a generally rectangular main bag body of bag material, parts of which may include reinforcing members and/or cushioning members, and to which other bag components are stitched, removably attached, and/or inserted.

FIG. 2A shows a front side of the bag 100. FIG. 2A also shows the shoulder strap 202 extended for a shoulder carrying mode of the bag 100, described above. The side covers 102 are held closed by fasteners which may be Velcro™ pads, snaps, or zippers, for example, as mentioned above.

FIG. 3 shows a back side of the mostly closed bag 100, as the side covers 102 are being unfolded, while FIG. 2A shows the front side of the bag 100 during this process. The strap arrangement 310, 306, 304, already described, which provide the backpack carrying mode, do not need to be removed during the opening of the bag 100. Since portable computers above a certain size may be quite heavy, this backpack carrying mode may sometimes be a desirable way of carrying the equipment, from an orthopedic standpoint.

Figure 4:
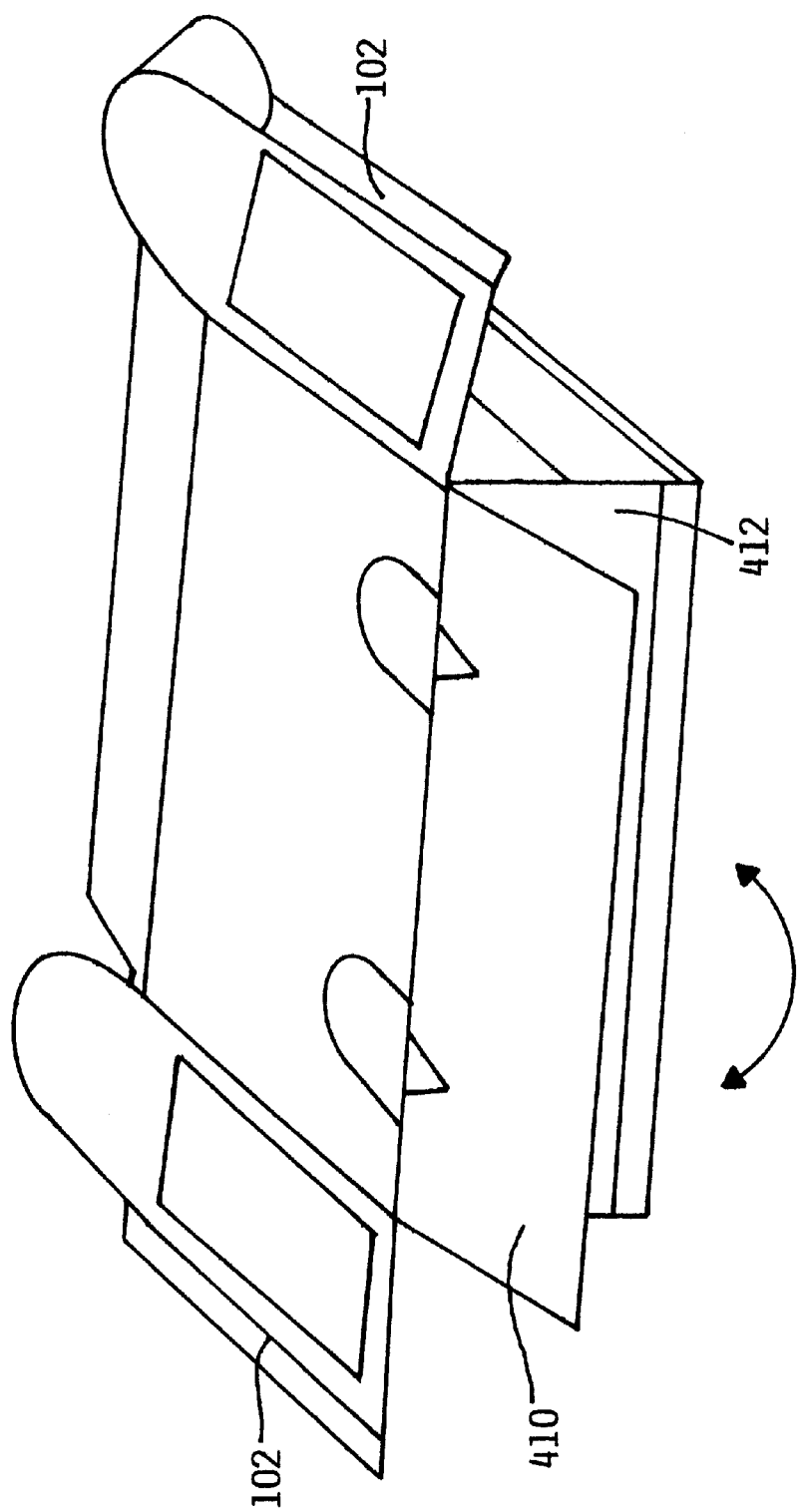
FIG. 4 is a view illustrating a mobile computing bag in one stage of being opened according to an exemplary embodiment of the invention.

Continuing with the bag opening operation, after the side covers 102 are opened, the bag 100 may then be placed on a surface with the front side down, as shown in FIG. 4, and another cover, panel 410, which may have been held closed in the same manner as covers 102, i.e., preferably by Velcro™ type fasteners, for example, is then flipped up from the bottom of the bag 100. After lifting cover panel 410 in this way, the remainder of the bag 100 can be unfolded as shown in FIGS. 5 and 6A, so that the inside of the bag 100 is facing up away from the surface on which the bag 100 has been opened.

Figure 5:
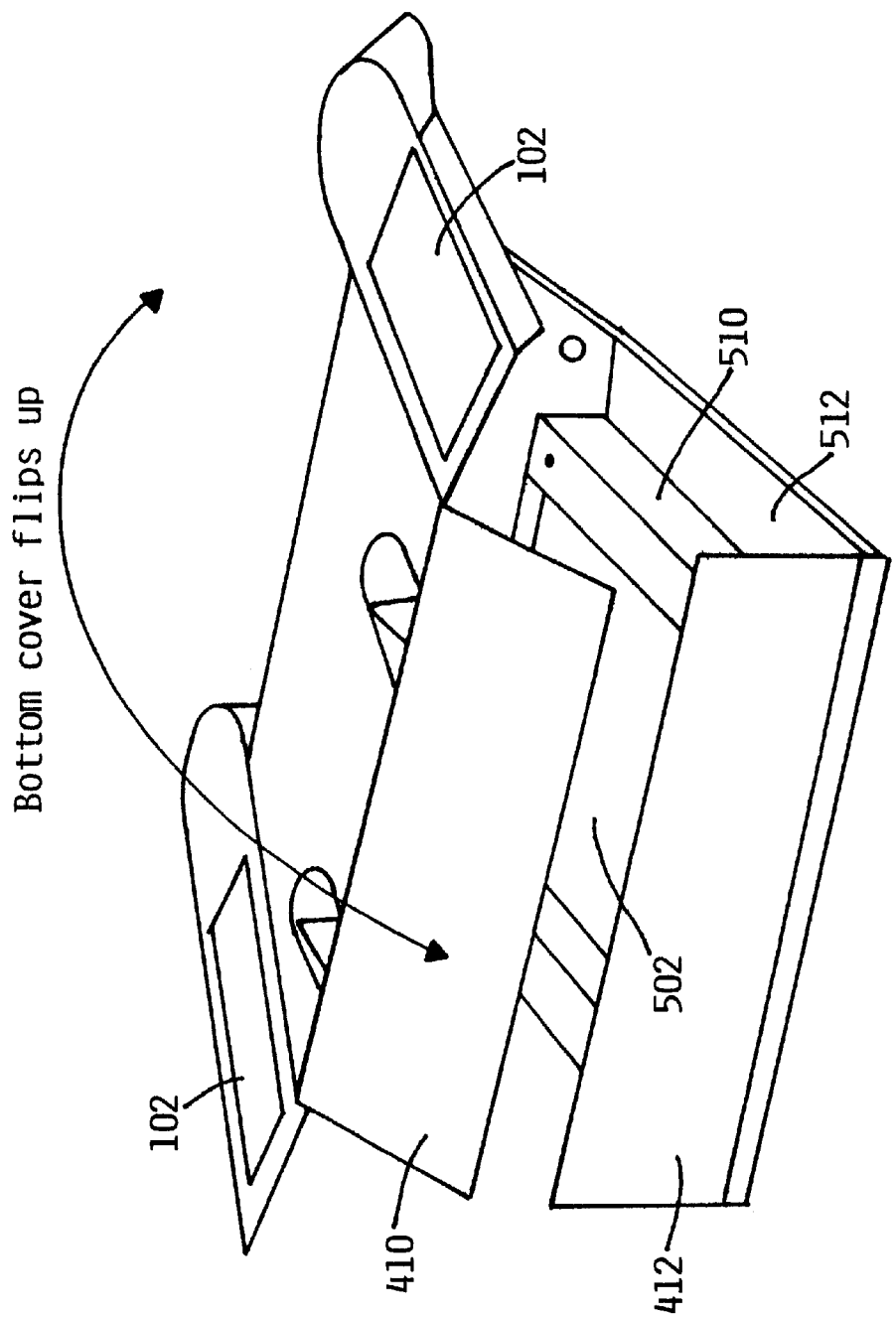
FIG. 5 is a view illustrating a mobile computing bag in a further stage of being opened according to an exemplary embodiment of the present invention.
Figure 6A:
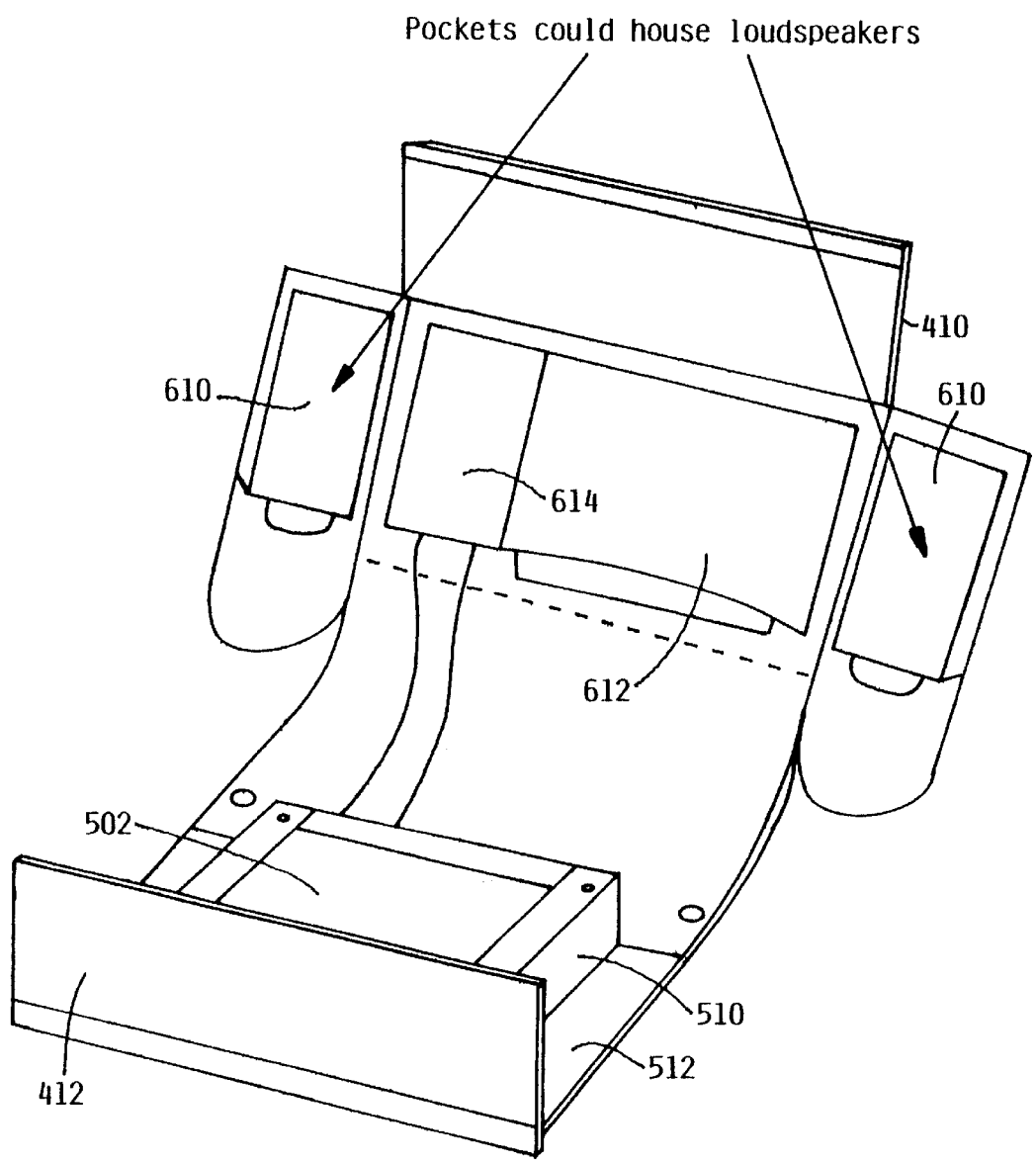
FIG. 6A is a view illustrating a mobile computing bag in a further stage of being opened according to an exemplary embodiment of the present invention.

The bottom of the bag 100, as can be seen most easily from FIGS. 4 and 5, is formed of two the panels 410 and 412, which are fabric covered rigid panel members that overlap when the bag 100 is completely closed, thereby forming a sturdy and flat bag bottom. At this point, it should be noted that these and other rigid panel members of the bag 100 could be formed using various known materials, such as a light-weight but strong plastic laminate or composite material covered by fabric and possibly padded throughout or at selected areas. Preferably, the fabric covered rigid material provides an attractive and sturdy protective panel, but one that is not so rigid as to be brittle, i.e., a panel that can protect the bag contents by withstanding some degree of force without shattering or breaking.

The fabric covering would be a light-weight but tough, preferably water resistant material, such as "Pack Cloth" nylon or Cordura nylon or the like, which is used in backpacks, garment bags, and the like, to provide some degree of protection for the equipment inside the bag 100. Of course, real leather materials could be used as an attractive alternative where water and/or weather are not a concern.

The bag fabric may also preferably be a material that is not subject to static charge build-up, or which can be made so by treatment, since such charges could potentially damage sensitive electronic components carried within the bag 100.

It is also possible that the material could be selected to provide shielding from various types of radiation, such as heat, light, x-rays, and other forms of radiation, where feasible, for situations where the bag 100 and its contents could be subjected to these potentially damaging types of radiation. Various metal stranded and metallic foil materials are possible, and these could be integrated into the material weave or the panel members of the bag, for example.

For underwater applications, anti-buoyancy inserts could be used to prevent the bag 100 and its contents from floating away. Alternatively, floatation materials might be added within the bag material so that the bag 100 and its contents would float on the surface of a body of water if washed overboard.

Returning to FIG. 7, the outer panel 410 which forms a part of the bottom cover of the bag 100 is flexibly fixed along one edge to fabric covered rigid panel 712, and removably fastened to the inner panel 412, which also forms part of the bag bottom, along another edge. The inner panel 412 can pivot in the fashion of a hinge along one edge where it meets fabric covered rigid panel 512. Both the outer and inner panels 410 and 412, as well as panel 512, are preferably formed of a rigid reinforcement member covered by the woven bag material, to provide a sturdy, stableplatform when the bag 100 is resting as shown in FIG. 1. The woven material may be preferably formed as a single piece, with the respective rigid panel members stitched therein at appropriate places to provide the respective edges. However, other materials and techniques are possible within the spirit of the invention, as would be apparent to those skilled in the art. For example, the bag could be formed of separated fabric-covered panel members, stitched together at appropriate places.

As can be seen from FIGS. 5 and 6, secured by inner side covers 510, which are attached to an inside surface of fabric covered rigid panel 512 of the bag 100, is a portable, e.g., laptop, computer 502. As can perhaps be seen best in FIG. 6A, 6B or 7, the insides of the side covers 102, as well as the inner surface of the rest of the bag 100, can be advantageously provided with a number of pockets 610, 612, and 614, which can serve as handy storage for various and sundry computer appliances/accessories, such as keyboard and mouse, loudspeakers, extension cords, batteries, PCMCIA cards, diskettes, etc.

With reference to FIGS. 6B, 6D and 6E, the side pockets 610 may conveniently house external stereo speakers 620, for example. To provide for better acoustics, the side pockets 610 may be provided with a sound-transparent membrane or net 610A through which sound from speakers 620 can pass more readily than through ordinary material. With reference to FIGS. 6D and 6E, to secure the speakers 620 in side pockets 610, a piece of fabric or "lip" 616 may be provided along with a pushbutton snap set 618 as shown. The side covers 106 may also be provided with respective pushbutton snaps 619 which mate with the snaps 618 on the lips 616 and which can thereby be used to hold the side covers 106 in a closed position. Of course, Velcro™ or other types of means to secure could be used in place of the pushbutton snaps sets within the spirit of the invention, as would be apparent to one skilled in the art.

Of course, speakers 620, and other accessories, often require cables to connect to a portable personal computer, or the like. As can be seen in FIGS. 6B and 6C, one or more cable guides 622, with pushbutton snap 623, may be provided in strategic locations to hold cables 624 in place. Such cable guides 622 could be made of any sturdy material, such as textile, leather or plastic. The cable guides 622 could be provided with an inner bendable material, e.g., metal, instead of snaps 623 or other fastening means, to hold them in an open or closed position.

As can be seen in FIG. 6B in the unfolded arch region of the bag, a pocket 626, having at least a rounded end, could be provided to hold cables for the speakers 620, the computer 502, or other devices/accessories. It may be convenient to provide a closure means, such as a Velcro™ or snap set, for this cable pocket 626, to ensure that any cables therein do not fall out during carrying of the bag 100. It is intended that this provision of closure means may also apply to any and all other pockets previously described and those yet to be described.

As can also be seen from FIG. 6B, one or more long slender pockets 628 may be conveniently provided along an edge of the region of the bag where computer 502 is placed, for housing pens, or other writing instruments, pointing devices, a stylus, etc.

The above examples of pocket storage illustrate how a bag 100 according to an exemplary embodiment of the invention advantageously provides that storage is always conveniently located near to the computer 502. In this way, the stored items are easily and readily accessible when the computer 502 is being set-up or used.

Figure 7:
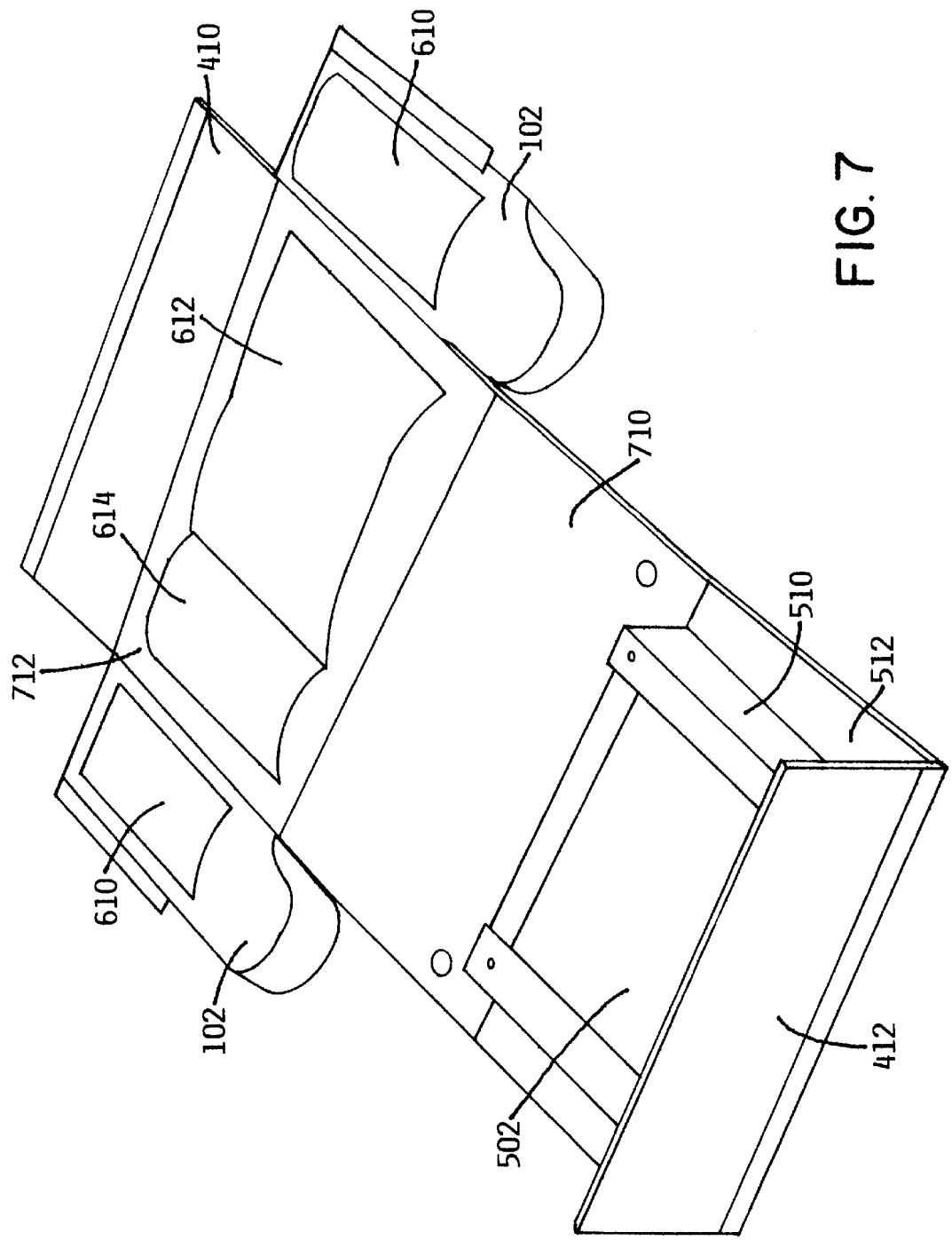
FIG. 7 is a view illustrating a mobile computing bag in a final stage of being opened according to an exemplary embodiment of the present invention.
Figure 8:
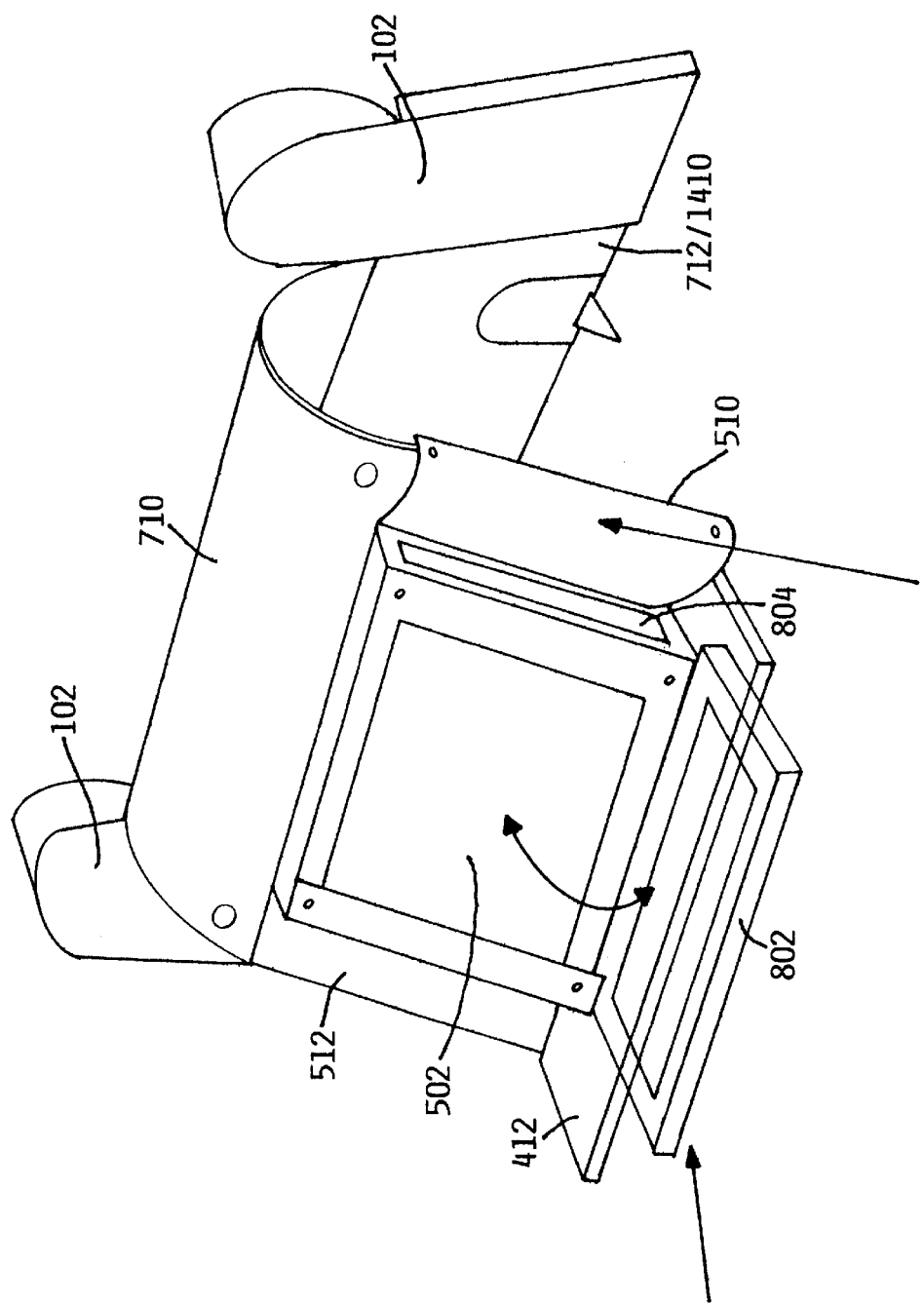
FIG. 8 is a view illustrating a mobile computing bag in a first stage of being set up to form a triangular frame according to an exemplary embodiment of the present invention.

Continuing with the bag opening operation, once the bag 100 is fully opened and laid out flat, as depicted in FIG. 7, the laptop computer 502 could be removed, as described with reference to FIG. 9, or the bag 100 could be further arranged into an arched or triangular shape, as shown in FIG. 8. Here in FIG. 8, the flexible portion 710 of the bag 100 forms an arch or the peak of a triangle between fabric covered rigid panels 512 and 712, with fabric covered rigid panel 412 extending along a surface on which the bag 100 is placed.

The flexible portion 710 is preferably formed of the same fabric material as the rest of the bag, but does not have a rigid panel member disposed therein. Instead of a rigid panel member, flexible portion 710 could simply be fabric material filed with a thin sheet of rubber, foam rubber, flexible metal, plastic or compression molded polyethylene foam, or the like, for providing some flexibility and impact protection. If a less "floppy" form is desirable, the flexible plastic or metal material disposed within the fabric material advantageously forms the arch. Alternatively, a hinged structure could be disposed therein to better form the peak of a triangle, when the bag 100 is set up in this manner. These variations are considered to be within the spirit of the invention.

Such an arrangement of the bag 100 as shown in FIG. 8 advantageously provides a comfortable angle for working on the touch screen of laptop computer 502, for example. Also, in the set up position shown in FIG. 8, a computer keyboard 802 (which may be housed in an additional textile cover) can be flipped down to be parallel to the inner panel 412 for easy use.

The inner side covers 510, which secure the laptop computer 502 to the bag 100, can fold out as shown in FIG. 8 to provide easy access to any connectors 804 along an edge of the laptop computer 502.

Figure 9:
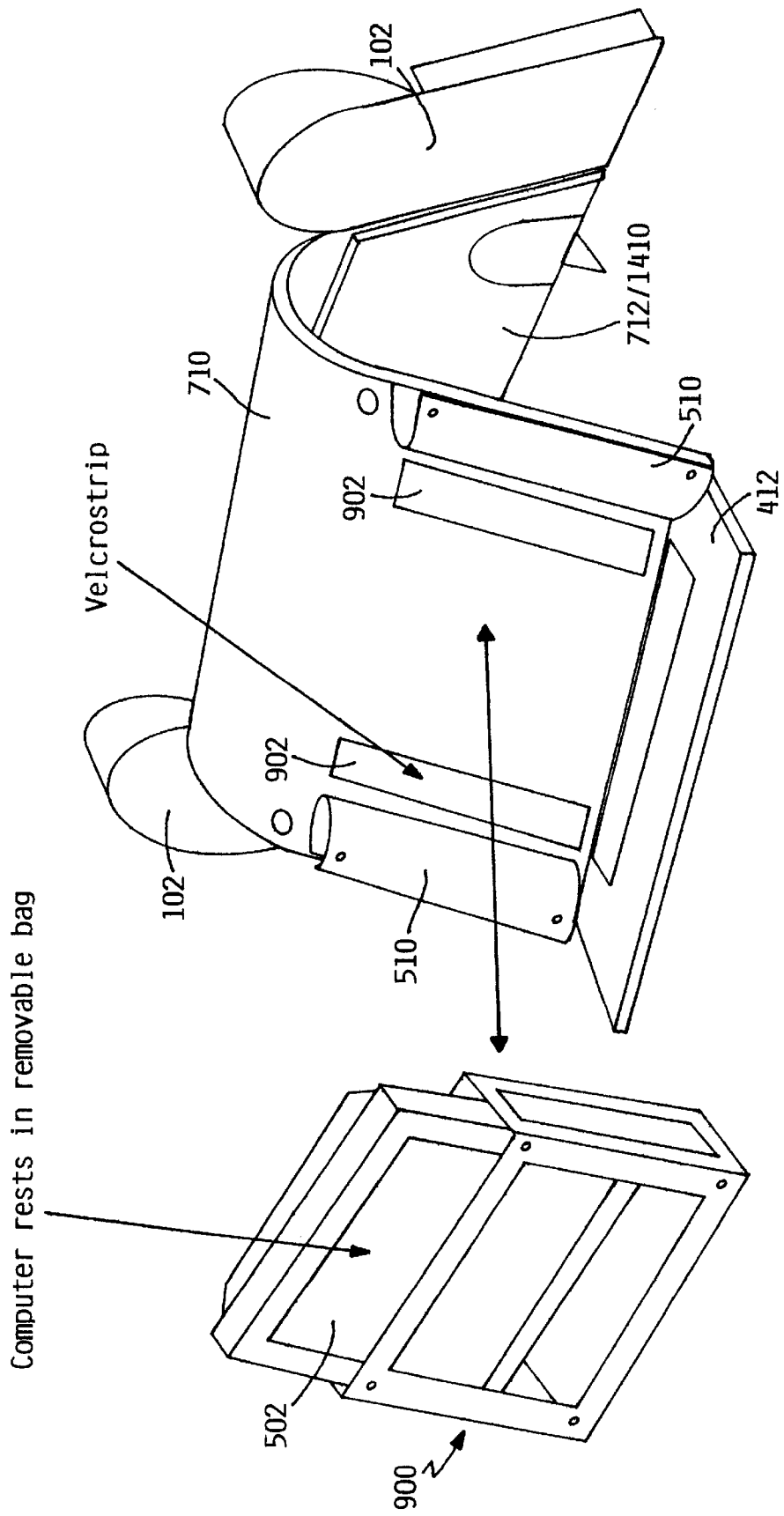
FIG. 9 is a view illustrating the removal of a portable computer in an inner bag of a mobile computing bag according to an exemplary embodiment of the present invention.

As shown in FIG. 9, the computer 502 may also be held in a separate removable cover or inner bag 900 that can be easily removed by opening the inner side covers 510, and loosening one or more fasteners, preferably Velcro™ type strips, 902. The removable computer bag 900, in which a computer or other electronic equipment 502 rests in place, is shown removed from the main or outer bag 100 in FIG. 9. When within the bag 100, the inner bag 900 gives access to the laptop computer 502 connectors 804 through openings in the removable bag 900, when the inner side covers 510 are unbuttoned, as depicted in FIGS. 8 and 9.

Figure 10:
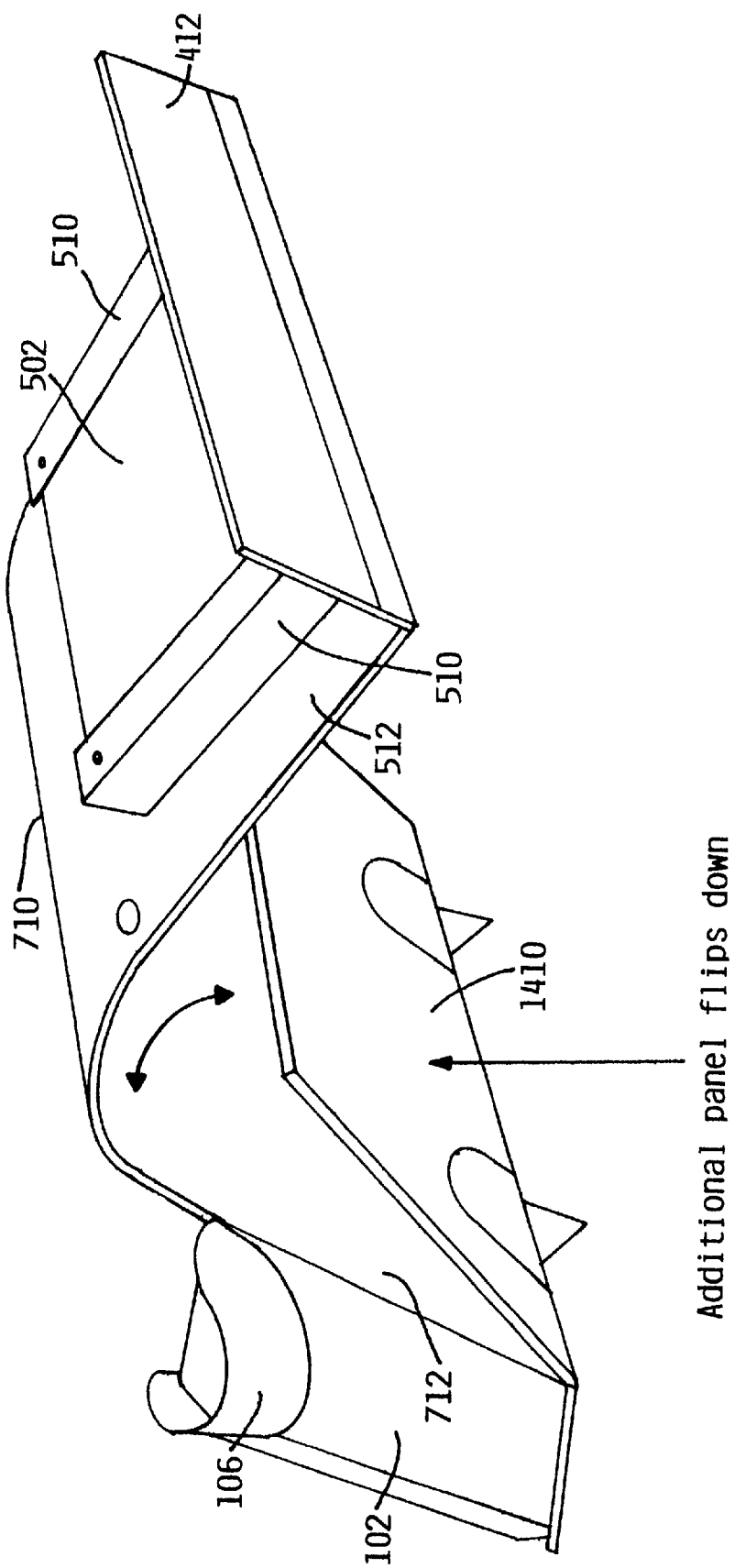
FIG. 10 is a view illustrating a mobile computing bag in a further stage of being set up to form a triangular frame according to an exemplary embodiment of the present invention.
Figure 11:
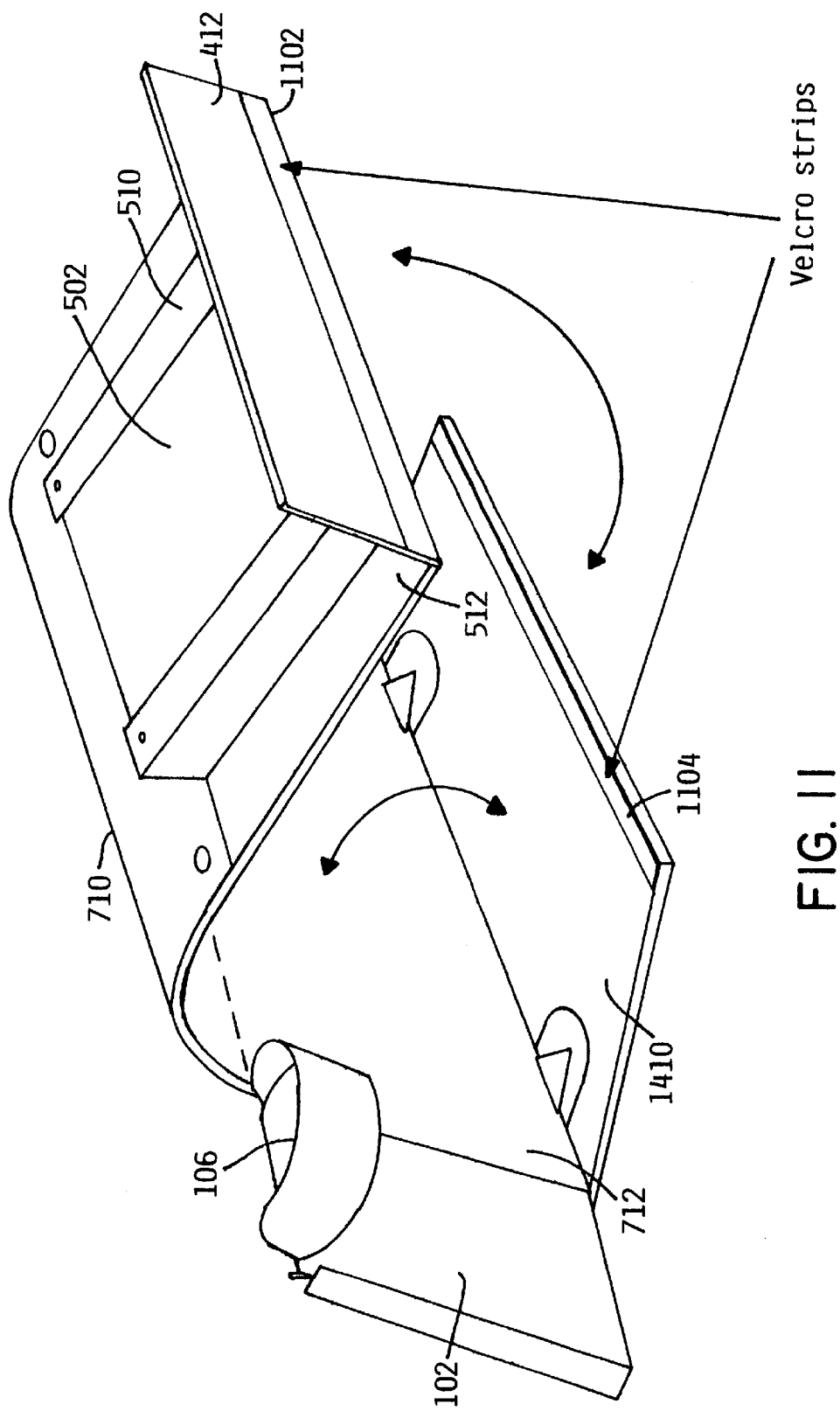
FIG. 11 is a view illustrating a mobile computing bag in a further stage of being set up to form a triangular frame according to an exemplary embodiment of the present invention.

Once the bag 100 is placed in a triangular or arched position (FIG. 8 or 9), another fabric covered rigid panel 1410 can be flipped down, as depicted in FIG. 10, from the back of fabric covered rigid panel 712. This additional panel 1410 can then be secured to fabric covered rigid panel 412 by fasteners, preferably a Velcro™ fastener set 1102/1104, to thereby form a stable and secure base for the arched or triangular arrangement of the bag 100, as depicted in FIGS. 11 and 12.

Figure 12:
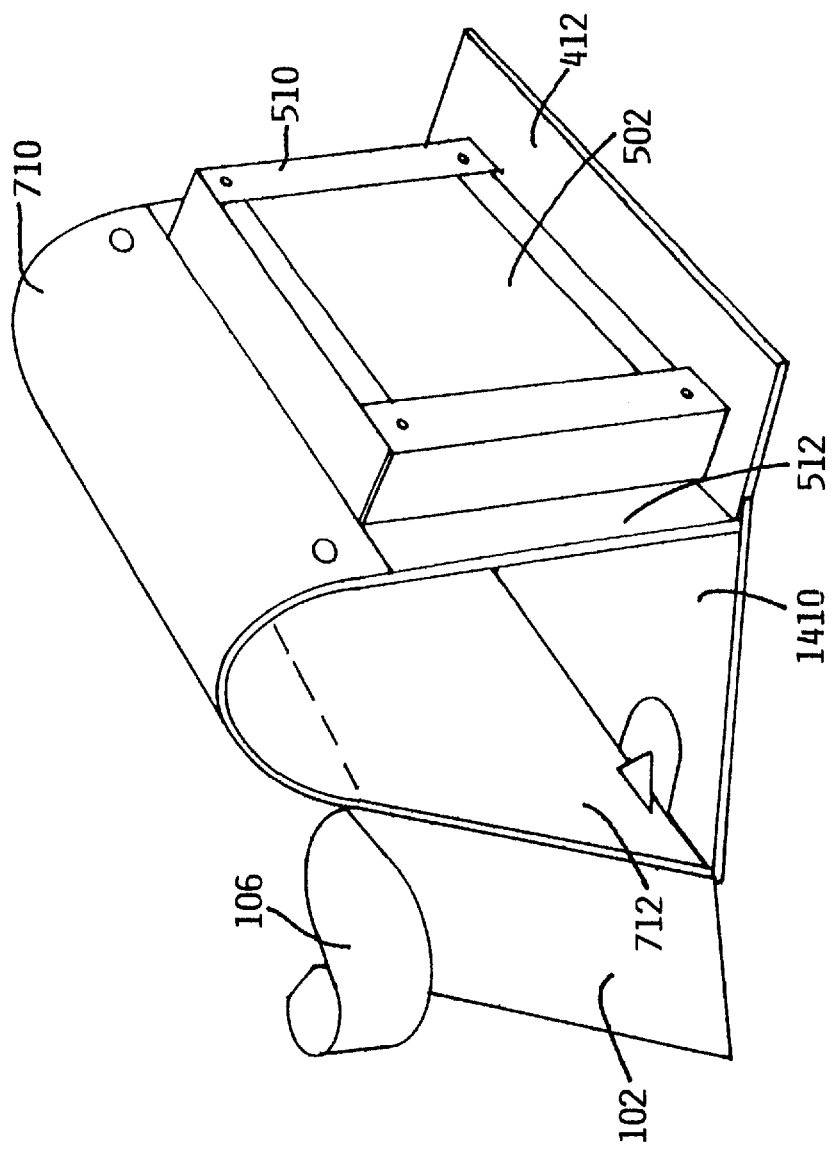
FIG. 12 is a view illustrating a mobile computing bag in a further stage of being set up to form a triangular frame according to an exemplary embodiment of the present invention.
Figure 13:
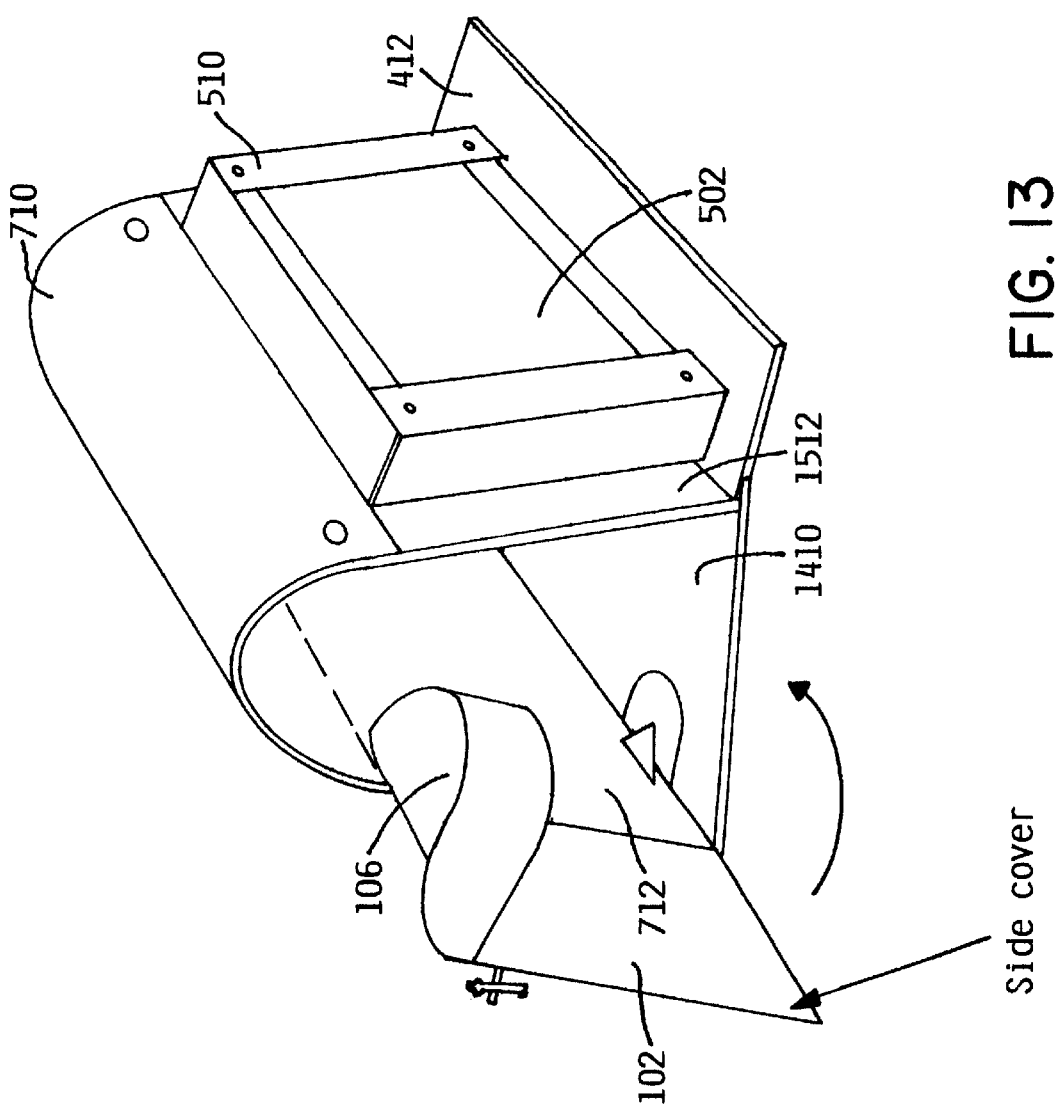
FIG. 13 is a view illustrating a mobile computing bag in a further stage of being set up to form a triangular frame according to an exemplary embodiment of the present invention.

In this arched or triangular arrangement of the bag 100 shown in FIG. 12, it can be seen that the bag 100 has been essentially turned almost completely inside-out from the configuration shown in FIG. 1, for example. The pockets and portable computer are thus conveniently outwardly accessible in this inside-out configuration.

Figure 16:
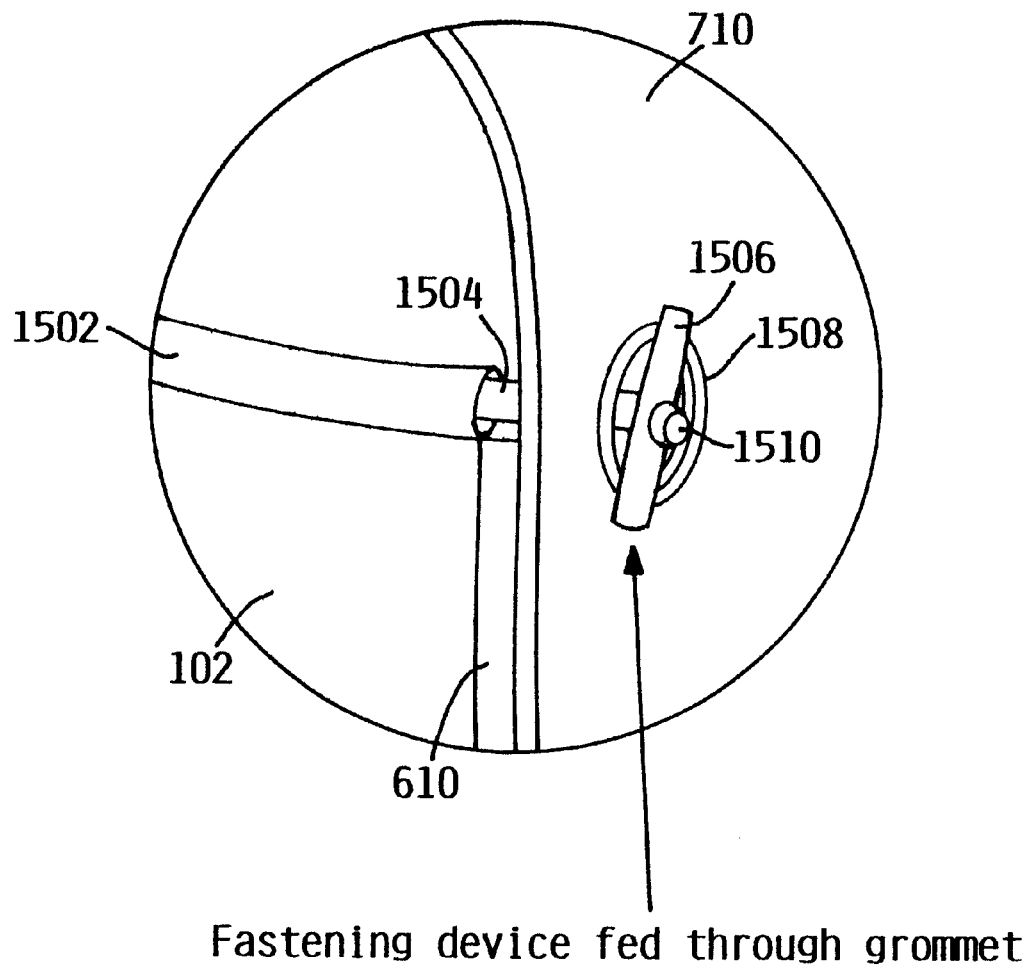
FIG. 16 is a further detail of a fastening device shown in FIGS. 14 and 15 according to an exemplary embodiment of the present invention.

Even more stability may be provided to the arched or triangular configuration by flipping the side covers 102 on both sides around to close the open ends of the configuration, and making use of fastening device 1500, depicted in FIGS. 13, 14, 15 and 16. The fastening device 1500 includes, for example, an elastic cord 1504 which may be disposed in a lining 1502 of the side cover pockets 610, having a peg 1506 secured by knot 1510. The peg 1506 can be fed through grommet 1508 to be secured, as shown in FIGS. 15 and 16. Both side covers 102 would preferably have identical fastening devices 1500. Of course, other types of fastening devices besides the peg/grommet type could be used within the spirit of the invention.

Figure 17:
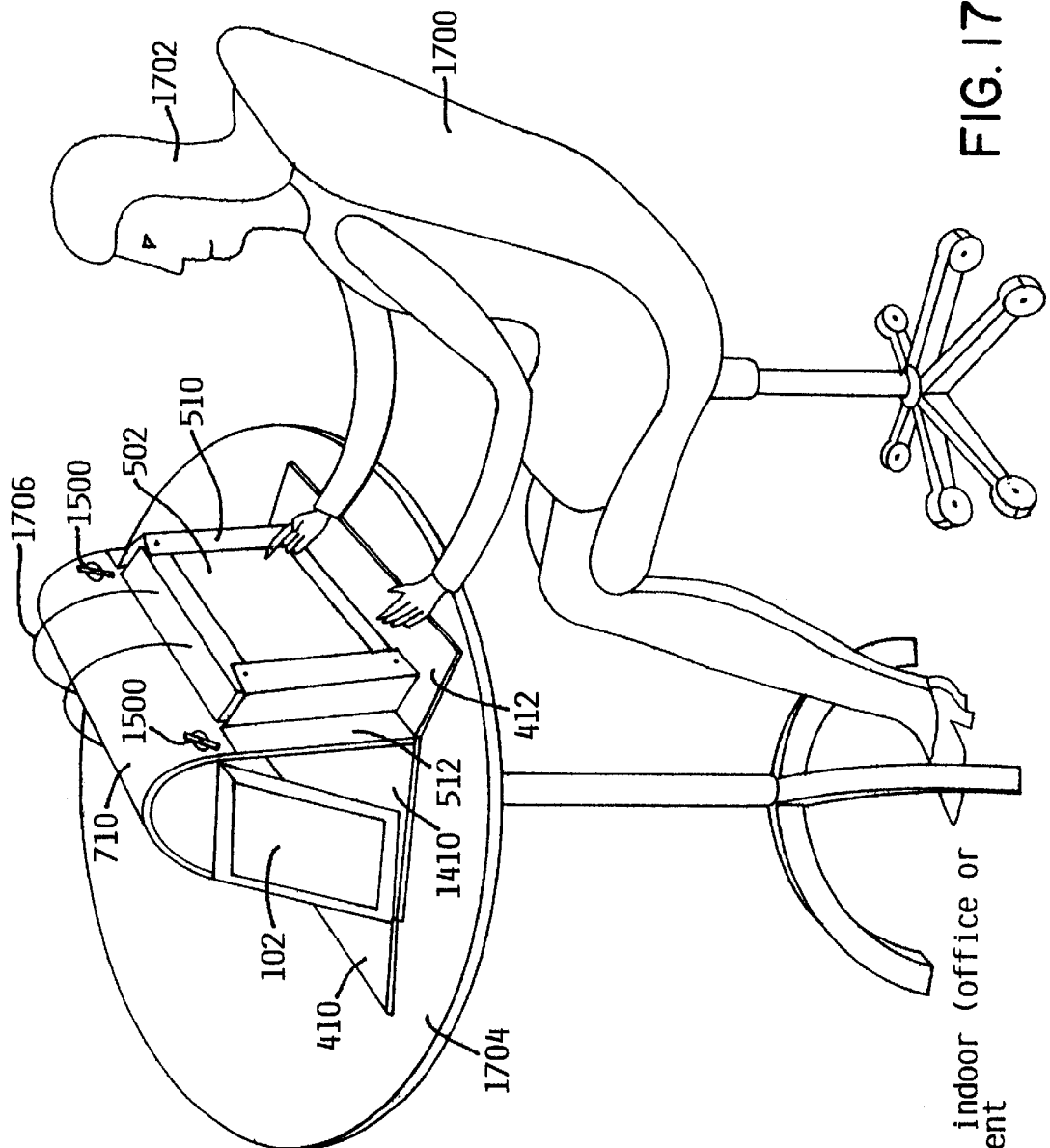
FIG. 17 illustrates a mobile computing bag set up to form a triangular frame being used on a table according to an exemplary embodiment of the present invention.
Figure 18:
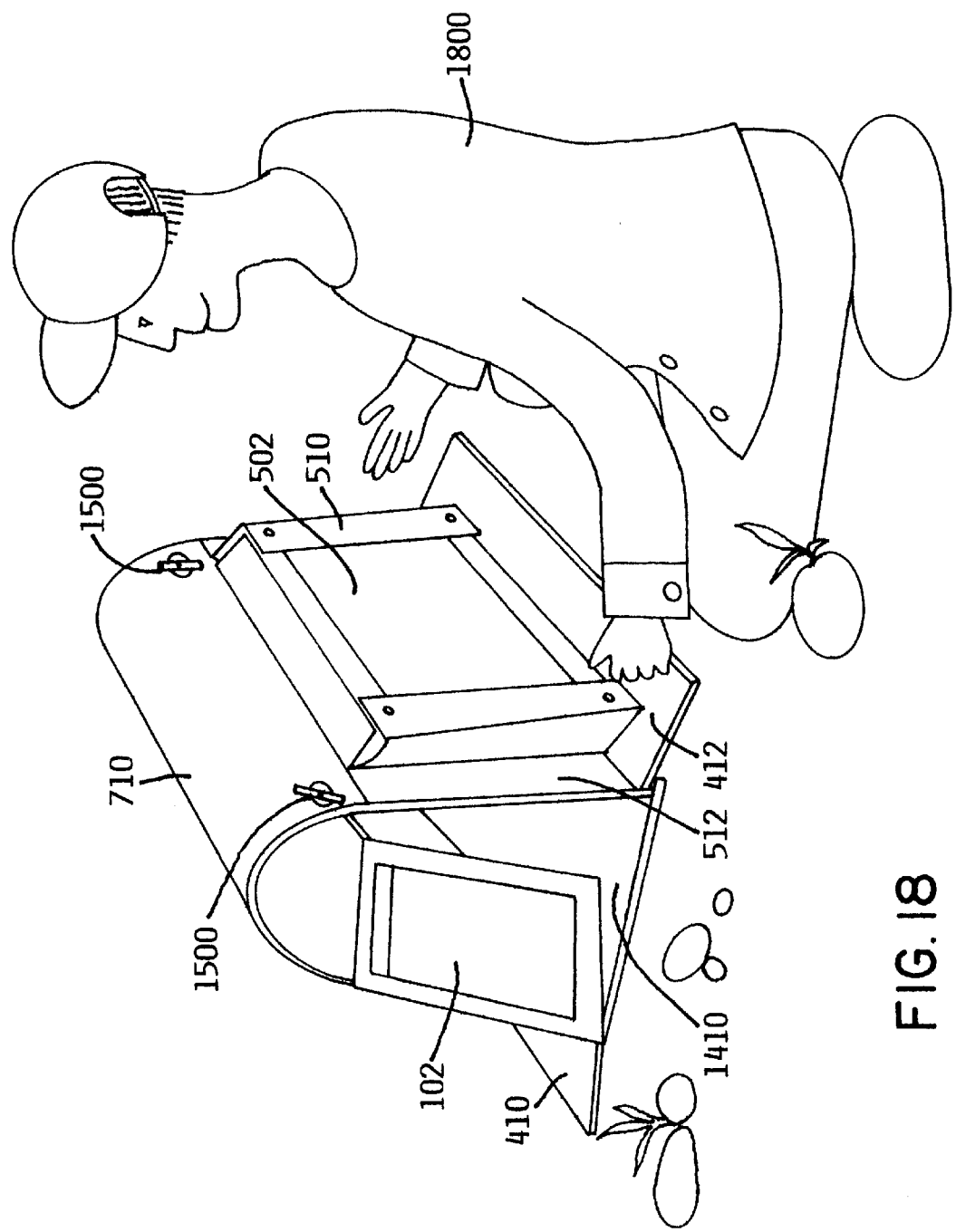
FIG. 18 illustrates a mobile computing bag set up to form a triangular frame being used on the ground according to an exemplary embodiment of the present invention.

As is apparent, once the bag 100 is opened and set up as a freestanding platform as shown, ready accessibility to all stored items in the now exposed pockets, is provided. By the arrangement of the component panels of the bag, and the use of Velcro™ and/or other fastening devices, the bag 100 is easily transformed into a very stable arched or triangular frame, as shown in FIG. 14. With this configuration, a user 1702 can work on the computer 502 in an ergonomically comfortable position, sitting in a chair 1700 at a table 1704 as shown in FIG. 17. Alternatively, with this stable configuration, a user 1800 could use the computer 502 while sitting on the ground as shown in FIG. 18.

Figure 19:
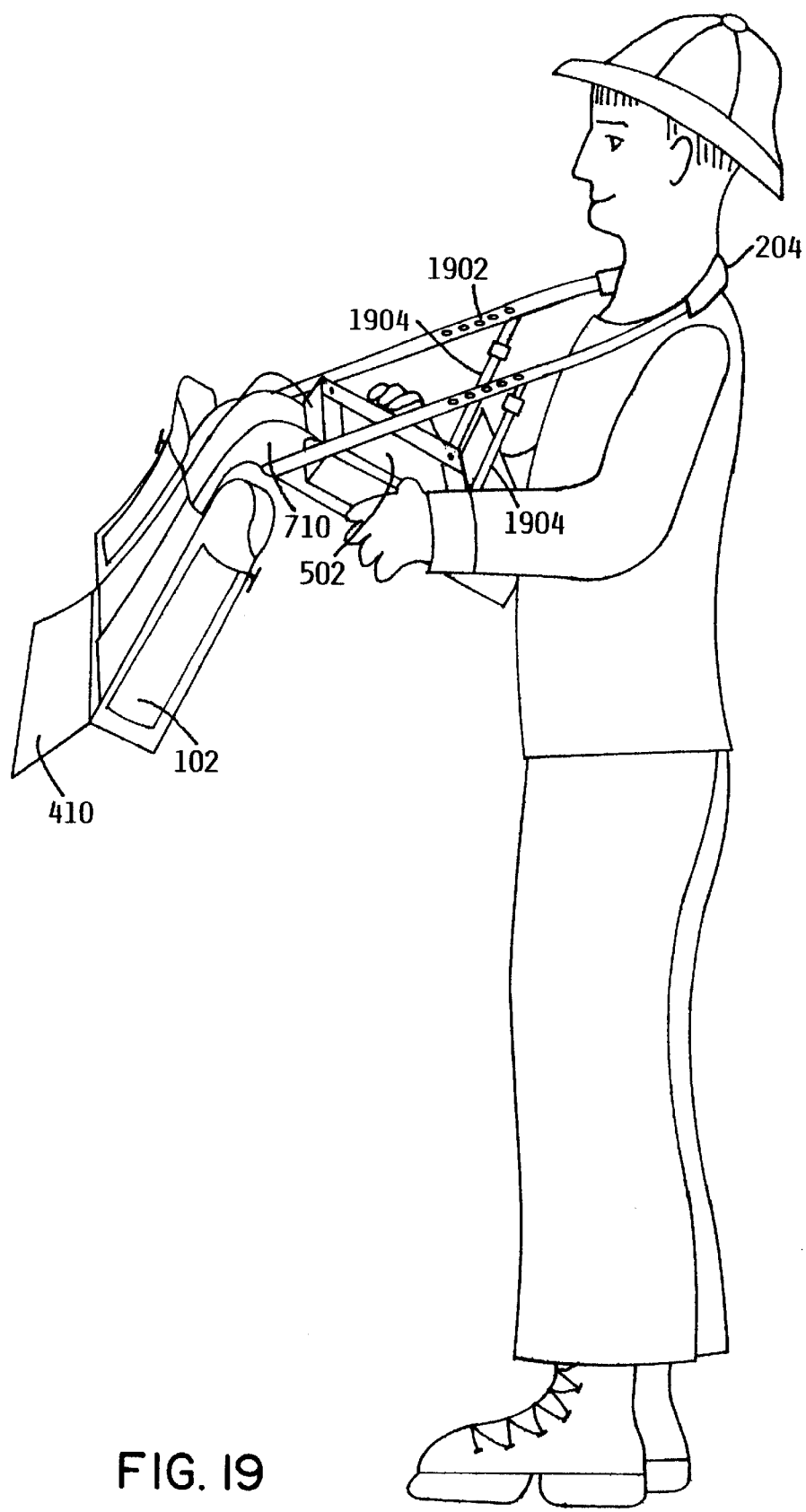
FIG. 19 illustrates a mobile computing bag used while standing according to an exemplary embodiment of the present invention.

Additionally, according to another feature of the bag 100, after being opened, the bag 100 may be used in a standing up position by strapping the opened bag 100 to one's body using a strap arrangement 1902/1904, as shown in FIG. 19. As described before with respect to the shoulder bag and backpack modes, the straps 1902 could be identical to and/or one in the same as straps 310 and 202. Also, strap 202 could be reconfigured with grommets, as previously described, to form from a single piece the straps 1902. The additional pieces 1904 could be stored in one of the many storage pockets or left attached when not in use in this front-carrying mode.

Figure 20:
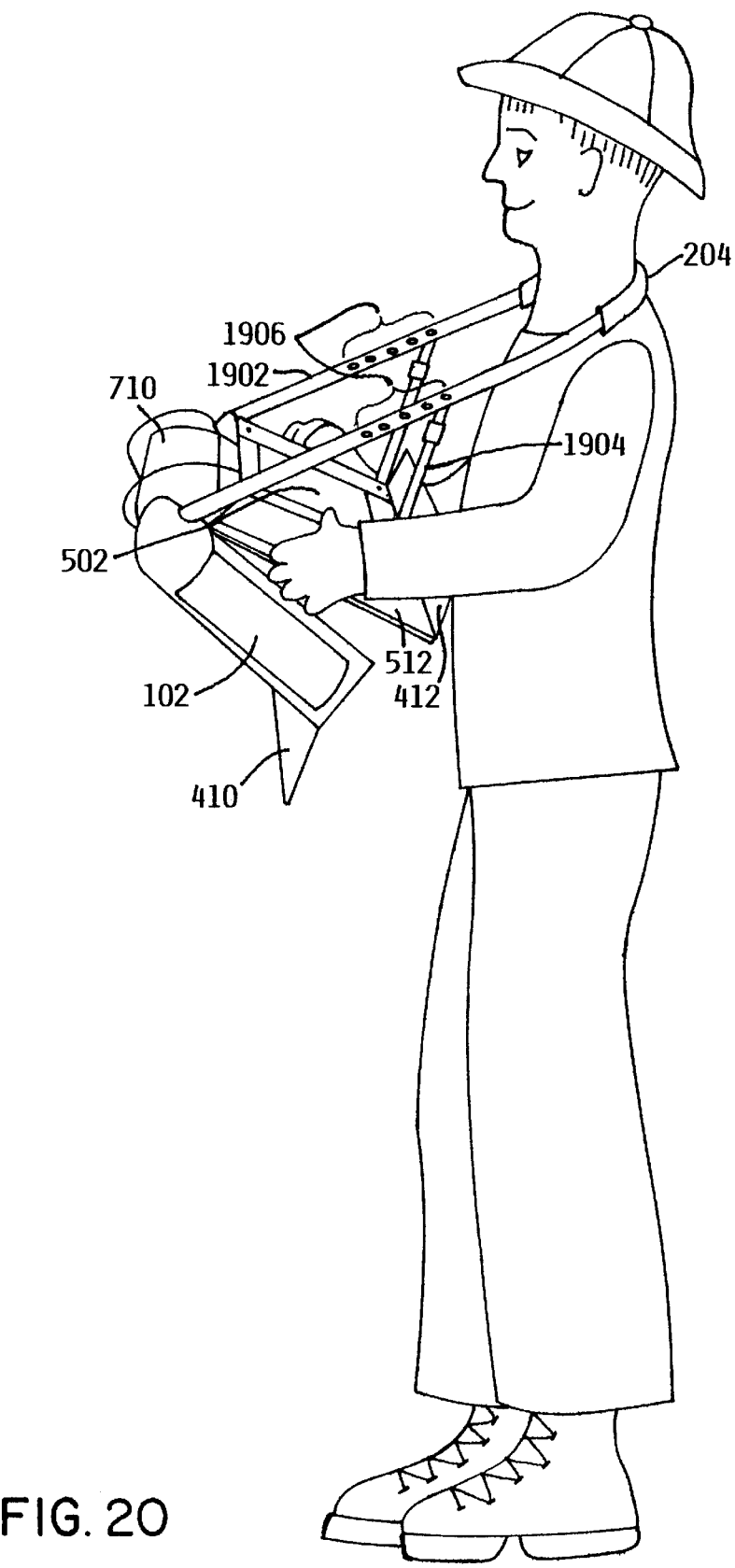
FIG. 20 illustrates a mobile computing bag used while walking according to an exemplary embodiment of the present invention.

Further, the shoulder pad 204 (and backpack shoulder cushions 304) also serves the purpose of a neck cushion as shown in FIGS. 19 and 20.

In all of the strap arrangements, it is contemplated that they should be adjustable to different body sizes, and this can be accomplished through the use of grommets 1906, as shown in FIG. 20, and/or "length adjusters" (not shown) that can be integrated into the straps.

The bag 100 in this configuration can even be used while walking as shown in FIG. 20. Such a configuration provides a high degree of mobility to the computer user, as can be readily appreciated. Additional straps (not shown) could be provided for further fastening of the opened bag 100 to the user's body, such as around the user's waist, further enabling user mobility and a comfortable working position. The arrangement shown in FIGS. 19 and 20 also allows ready access to appliances/accessories in the various now exposed pockets. FIG. 19 shows the setup with better access while standing.

As can be envisioned, the applications of an exemplary embodiment of a computing bag 100 according to the invention, could range from use on an expedition or an oil rig, at a sporting event, in a factory, in a medical context for remote areas, in any private setting, or on an airplane, to just name a few. Where an appropriate table-like surface is not available, the bag can provide a stable platform for working.

It is envisioned that size, materials and general styling including colors and logo, can be selected by the user according to a particular respective intended application. Therefore, details are not necessary for a complete understanding of this aspect of the invention.

The exemplary embodiment of a bag 100 according to the invention shown in the drawings was designed for a laptop computer, or the like. It can be seen that such a bag is especially useful for computers, or other portable equipment, which have a similar size to that of a laptop computer, or which are even bigger but still portable. Of course the size can be adjusted according to the dimensions of the computer, or other equipment, the bag is designed to hold, keeping in mind that the bag is generally intended for use in carrying a portable computer or other electronic device by an average person.

Therefore, the exact size and dimensions of the exemplary bag are not crucial to a complete understanding of the invention, and thus the drawings are presented without measurements indicated, and are not necessarily drawn to scale. The straps are advantageously designed to be adjustable for different body sizes as mentioned earlier.

A bag according to an exemplary embodiment of the invention is a manufactured article having a flexible panel with at least one rigid panel pivotally attached to the flexible panel along respective first edges thereof, the rigid panel and the flexible panel each having a respective unfixed second edge. At least one fastener is disposed for removably holding the respective unfixed second edge of the flexible panel to the respective unfixed second edge of the rigid panel, the flexible panel thereby being configurable as an arch with the rigid panel forming a base thereof.

The flexible panel has a first surface and a second surface and there is at least one storage pocket attached to the first surface of the flexible panel. A carrying handle is attached to the second surface of the flexible panel. The flexible panel and the rigid panel are configurable as an arch having the first surface of the flexible panel as an outer surface of the arch, and as an arch having the second surface of the flexible panel as the outer surface of the arch.

A plurality of storage pockets could be attached to the first surface of the flexible panel, and a shoulder strap attached to the second surface of the flexible panel. There could be two shoulder straps attached to the second surface of the flexible panel for enabling the carrying the manufactured article (bag) in a backpack mode.

In a further alternative embodiment, the flexible panel and the rigid panel are configurable as an arch having the first surface of the flexible panel as an outer surface of the arch, and having the second surface of the flexible panel as the outer surface of the arch. In this embodiment, first and second side covers are pivotally attached to the flexible panel. In this way, the flexible panel, the rigid panel and the side covers are configurable to form an arched enclosure.

Further, means for receiving an electronic device therein can be provided, and a strap arrangement attached to the first surface of the flexible panel for strapping the manufactured article (bag) to a user, the strap arrangement enabling the positioning of the article of manufacture and the electronic device in an orientation where the electronic device can be operated by the user while the user is carrying the article of manufacture.

It will be apparent to one skilled in the art that the manner of making and using the claimed invention has been adequately disclosed in the above-written description of the preferred embodiment(s) taken together with the drawings.

It will be understood that the above described preferred embodiment(s) of the present invention are susceptible to various modifications, changes, and adaptations, and the same are intended to be comprehended within the meaning and range of equivalents of the appended claims.

For example, as already mentioned, the invention is not limited to use with a portable computer, e.g., a laptop computer, but may be useful with a variety of types of portable equipment.

Further, although a number of equivalent materials and components may have been mentioned herein which could be used in place of the materials and components illustrated and described with reference to the preferred embodiment (s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. A computer bag, comprising:
   a flexible panel (710) having a first edge and a second edge;
   at least one rear rigid panel (712) having a first edge and a second edge, the second edge of the rear rigid panel being pivotally attached to the first edge of the flexible panel;
   at least one front rigid panel (512) having a first edge and a second edge, the first edge of the front rigid panel being pivotally attached to the second edge of the flexible panel;
   at least one bottom rigid panel (1410) having a first edge and a second edge, the second edge of the bottom rigid panel being pivotally attached to the first edge of the rear rigid panel;
   at least one fastener (1102, 1104) disposed for removably holding the first edge of the bottom rigid panel with respect to the second edge of the front rigid panel, the flexible panel thereby being configurable as an arch with the rigid panels forming a base thereof.

2. The computer bag according to claim 1, wherein the flexible panel comprises a first surface and a second surface;
   wherein there is at least one storage pocket attached to the first surface of the flexible panel;
   wherein there is a carrying handle attached to the second surface of the flexible panel; and
   wherein the flexible panel and the rigid panels are configurable as an arch having the first surface of the flexible panel as an outer surface of the arch, and alternatively reversible as an arch having the second surface of the flexible panel as the outer surface of the arch.

3. The computer bag according to claim 1, wherein the flexible panel comprises a first surface and a second surface;
   wherein there are a plurality of storage pockets attached to the first surface of the flexible panel; and
   wherein there is a shoulder strap attached to the second surface of the flexible panel.

4. The computer bag according to claim 1, wherein the flexible panel comprises a first surface and a second surface;
   wherein there are a plurality of storage pockets attached to the first surface of the flexible panel; and
   wherein there are first and second shoulder straps attached to the second surface of the flexible panel for enabling the carrying the computer bag in a backpack mode.

5. The computer bag according to claim 1, wherein the flexible panel comprises a first surface and a second surface, wherein the flexible panel and the rigid panels are configurable as an arch having the first surface of the flexible panel as an outer surface of the arch, and having the second surface of the flexible panel as the outer surface of the arch;
   and wherein the computer bag further comprises first and second side covers pivotally attached to the rear rigid panel, wherein the flexible panel, the rigid panels and the side covers are configurable to form an arched enclosure.

6. The computer bag according to claim 1, wherein the flexible panel comprises a first surface and a second surface;
   wherein there are a plurality of storage pockets attached to the first surface of the flexible panel, and means for receiving an electronic device therein; and
   wherein there is a strap arrangement attached to the first surface of the flexible panel for strapping the computer bag to a user, the strap arrangement enabling the positioning of the computer bag and the electronic device in an orientation where the electronic device can be operated by the user while the user is carrying the computer bag.

7. A computer carrying bag comprising:
   a main bag body including a generally rectangular piece of material having at least one rigid reinforcement member provided in at least one respective portion thereof, and having side covers attached thereto along sides thereof, the main bag body having a flexible portion configurable as an arch;

a plurality of pockets, some of the pockets disposed on the main bag body at least one of the pockets for holding a portable computer, and at least one other pocket for holding accessories, at least one pocket being disposed on each respective side cover; and fastening means on the main bag body for removably fastening at least the bag body and side covers in different configurations.

8. The computer carrying bag according to claim 7, wherein the at least one pocket for holding a portable computer comprises a removable bag which is removably attached to the main bag body.

9. The computer carrying bag according to claim 7, further comprising a carrying handle attached to the main bag body, whereby the computer bag can be carried like a brief case.

10. The computer carrying bag according to claim 7, further comprising a shoulder strap removably attached to the main bag body, whereby the computer bag can be carried like a shoulder bag.

11. The computer carrying bag according to claim 7, further comprising at least two shoulder straps removably attached to the main bag body, whereby the computer bag can be carried like a backpack.

12. The computer carrying bag according to claim 11, wherein the at least two shoulder straps are reconfigurable as a single shoulder strap, whereby the computer carrying bag can be carried like a shoulder bag, and are reconfigurable as a frame harness, whereby the computer carrying bag can be reconfigured as a computer carrying frame carried on the front of the body of a user.

13. The computer carrying bag according to claim 7, wherein the pockets on the side covers comprise loudspeaker carrying pockets having a perforated material for passing sound from the loudspeakers.

14. The computer carrying bag according to claim 7, wherein the plurality of pockets comprise at least one pocket for holding connector cables.

15. The computer carrying bag according to claim 7, wherein the plurality of pockets comprise at least one pocket for holding a stylus or writing instrument.

16. The computer carrying bag according to claim 7, wherein the plurality of pockets comprise at least one pocket for holding a keyboard.

17. The computer carrying bag according to claim 7, wherein the plurality of pockets comprise at least one pocket for holding a mouse.

18. The computer carrying bag according to claim 7, wherein the computer carrying bag fastening means can be used to reconfigure the computer carrying bag as a stable, free standing platform, with the main bag body flexible portion configured as an arch.

* * * * *